US010305867B2

(12) United States Patent
Maller et al.

(10) Patent No.: US 10,305,867 B2
(45) Date of Patent: *May 28, 2019

(54) SYSTEM AND METHOD FOR SECURED CONTENT DELIVERY

(71) Applicant: ECO-MAIL DEVELOPMENT LLC, Stamford, CT (US)

(72) Inventors: Jay Maller, Stamford, CT (US); Bikram Chaudri, New York, NY (US)

(73) Assignee: ECO-MAIL DEVELOPMENT, LLC, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/662,911

(22) Filed: Jul. 28, 2017

(65) Prior Publication Data
US 2018/0019974 A1 Jan. 18, 2018

Related U.S. Application Data

(63) Continuation of application No. 15/393,973, filed on Dec. 29, 2016, now Pat. No. 9,756,025, which is a (Continued)

(51) Int. Cl.
H04L 29/00 (2006.01)
H04L 29/06 (2006.01)
(Continued)

(52) U.S. Cl.
CPC .............. *H04L 63/045* (2013.01); *H04L 9/14* (2013.01); *H04L 51/08* (2013.01); *H04L 63/0218* (2013.01); *H04L 63/0435* (2013.01); *H04L 63/0209* (2013.01); *H04L 63/061* (2013.01); *H04L 63/08* (2013.01); *H04L 2463/041* (2013.01)

(58) Field of Classification Search
CPC . H04L 5/0007; H04L 5/0044; H04L 63/0428; H04L 2209/76; H04L 63/061
See application file for complete search history.

(56) References Cited

U.S. PATENT DOCUMENTS 7,305,711 B2 12/2007 Ellison et al.
2003/0105712 A1 6/2003 Bodensohn
(Continued)

FOREIGN PATENT DOCUMENTS

EP 1 701 501 9/2006

Primary Examiner — Ghazal B Shehni
(74) Attorney, Agent, or Firm — Leason Ellis LLP

(57) ABSTRACT

A content delivery platform is provided that includes generating a first content package of content that is encrypted with a unique symmetric key, and a second content package including a link encrypted with the key to the first content package. The first content package is stored in a repository, and a request including the key is transmitted to a first computing device associated with a mail exchange for an encryption key file. An encryption key file is generated using the unique symmetric key and together with a authorizing token is received. A third content package is generated that is encrypted using the encryption key file and includes the encrypted link. The third content package is transmitted to a distributor gateway and the encrypted link is accessible in response to the consumer decrypting the third content package. The link is available to provide to access to the content for the consumer.

16 Claims, 20 Drawing Sheets

Related U.S. Application Data continuation of application No. 14/530,511, filed on Oct. 31, 2014, now Pat. No. 9,537,836.

(60) Provisional application No. 61/898,440, filed on Oct. 31, 2013, provisional application No. 61/898,446, filed on Oct. 31, 2013.

(51) Int. Cl.
*H04L 12/58* (2006.01)
*H04L 9/14* (2006.01)

(56) References Cited

U.S. PATENT DOCUMENTS

| | | |
|---|---|---|
| 2003/0182234 A1 | 9/2003 | Degroot |
| 2009/0164781 A1 | 6/2009 | Bouchard |
| 2011/0033050 A1 | 2/2011 | Maller |

SYSTEM AND METHOD FOR SECURED CONTENT DELIVERY

CROSS-REFERENCE TO RELATED APPLICATIONS

The present application is a continuation of U.S. Non-Provisional patent application Ser. No. 15/393,973, filed Dec. 29, 2016, which is a continuation of U.S. Non-Provisional patent application Ser. No. 14/530,511, filed Oct. 31, 2014, now U.S. Pat. No. 9,537,836, issued Jan. 3, 2017, which claims the benefit of U.S. Provisional Patent Application Ser. No. 61/898,440, filed Oct. 31, 2013, and U.S. Provisional Patent Application Ser. No. 61/898,446, filed Oct. 31, 2013, the contents of each of which are hereby incorporated by reference in their entireties as if set forth herein.

FIELD

The present application relates, generally, to networks and, more particularly, to secured content distribution.

BACKGROUND

In the past, distribution of commercial mail has depended on a large and complex process centered around the movement of paper. Paper needed to be delivered to the mail provider as raw material in the printing of documents. Paper also needed to be moved from the point of printing to the United States Postal Service (USPS) and within the USPS to a recipient destination. Even after delivery to the recipient, paper must be managed in order to reach the intended recipient or otherwise undergo an organization's processing requirements before ultimately being forwarded to long-term storage or disposal. These processes were necessary and reasonably efficient in a world where digital communication did not exist; however, the point of the process was never to move paper, but rather to move data. In today's electronic world it is entirely possible to reengineer the process to eliminate paper and remove the steps and costs associated with movement of physical mail.

The advent of email allows data to be quickly moved from one point to another without the need for paper or all of the requisite steps and costs of moving paper. The volume of email transacted daily has grown to quantities that are difficult to imagine. Nevertheless, current implementations of email do not adequately meet many of the requirements of commercial mail from either a provider or recipient standpoint. Email addresses may be transient and it is difficult to determine if any given address is either current or valid. Content within the body of an email is often unstructured and largely inconsistent. Email is relatively unsecure and can be intercepted more readily than physical mail as the later requires both the mail and the interceptor to be in the same place at the same time. Moreover, verification of normal email delivery is uncertain. Another complexity in traditional email management concerns the manner of organizing emails. Organization of email is at the discretion of the recipient, and management and processing of email messages are subject to the diligence of the user. Finally, if not appropriately backed up, email can be lost and irretrievable. As a direct result of these limitations, commercial providers have shied away from email as the primary form for distributing electronic versions of commercial mail.

Yet some commercial providers have begun utilizing "paperless" alternatives. This method eliminates the paper and the components of the legacy process that relate to moving physical paper. Unfortunately, however, the paperless alternatives available so far have been less desirable than paper-based delivery methods because they lack the passive receipt and aggregation components of both physical mail and email. The predominant paperless alternatives available today require a recipient to "follow a link," sign-on to a provider website, and then open the required document. This approach prevents interception of personal or sensitive information. However, if the recipient fails to retrieve a document, he or she might miss a deadline. This is attendant with potential financial repercussions, legal implications, or both. As well, this process places additional time burdens on the recipient and can become particularly onerous if the recipient has to follow links to review materials relating to multiple commercial relationships.

Known systems are inherently different than other paperless systems in that they are focused on a singular type of document (an invoice) and tailored to process that one type of document. EBPP systems are directed to electronic payment and do not address non-payment related mail or many of the myriad consumer problems associated with document distribution, retention, and management.

Historically, replacements to physical mail distribution systems have been driven by providers who are motivated to lower the substantial costs associated with physical document distribution. Because the focus has been on the provider's cost, the complex requirements necessary to motivate recipients to convert away from physical document distribution have not been met. However, the current invention provides a system and method that, among other things, addresses the needs of recipients' while also lowering the costs associated with physical document distribution. Alternatively or in addition, the current invention provides a system and method that, among other things, addresses the needs of providers (e.g., document distributors) by providing audit trails of proof of delivery. Alternatively or in addition, the current invention provides a system and method that, among other things, enables providers and subscribers to accept communications from one another through a secure portal that, on the one hand, ensures that the content of such communications are shielded from viewing by any intermediary—including the secure portal, and on the other hand ensures that recipients receive only authorized messages and that they can manage and direct such messages in a private manner that is not exposed to the provider. The current invention can provide these solutions and solutions to other problems in the art as will be appreciated from the discussion below.

The present application addresses these and other considerations.

SUMMARY

In one or more implementations, a method and/or apparatus is provided for providing a content delivery platform for delivery of content to a consumer. A first content package is generated that includes content that is encrypted with a unique symmetric key, and a second content package is generated that includes a link to the first content package. The link is also encrypted with the unique symmetric key. The first content package is stored in a repository, and a request that includes the unique symmetric key is transmitted to a first computing device associated with a mail exchange for an encryption key file. An encryption key file is generated using the unique symmetric key and together with a token providing authorization for the content to be delivered to the consumer is received and a third content package is generated that is encrypted using the encryption key file and that includes the encrypted link. The third content package is transmitted to a distributor gateway and the encrypted link is accessible in response to the consumer decrypting the third content package, and the link is available to provide to access to the content for the consumer.

These and other aspects, features, and advantages can be appreciated from the accompanying description of certain embodiments of the invention and the accompanying drawing figures and claims.

DETAILED DESCRIPTION OF CERTAIN EMBODIMENTS OF THE INVENTION

By way of overview and introduction, various implementations of the present application provide for a system and method for secure content production and distribution within and between one or more networks, including local intranets and large data communication networks, such as the Internet. In one or more implementations, distribution of electronic content, such as documents, is provided in a structured and secured environment, and is usable to replace or otherwise augment existing physical mail and electronic mail (e.g., "e-mail") distribution systems. In addition to providing for messages being transferred between respective parties, the present application provides a suite of services in support of users, including with regard to production and distribution.

Figure 1:
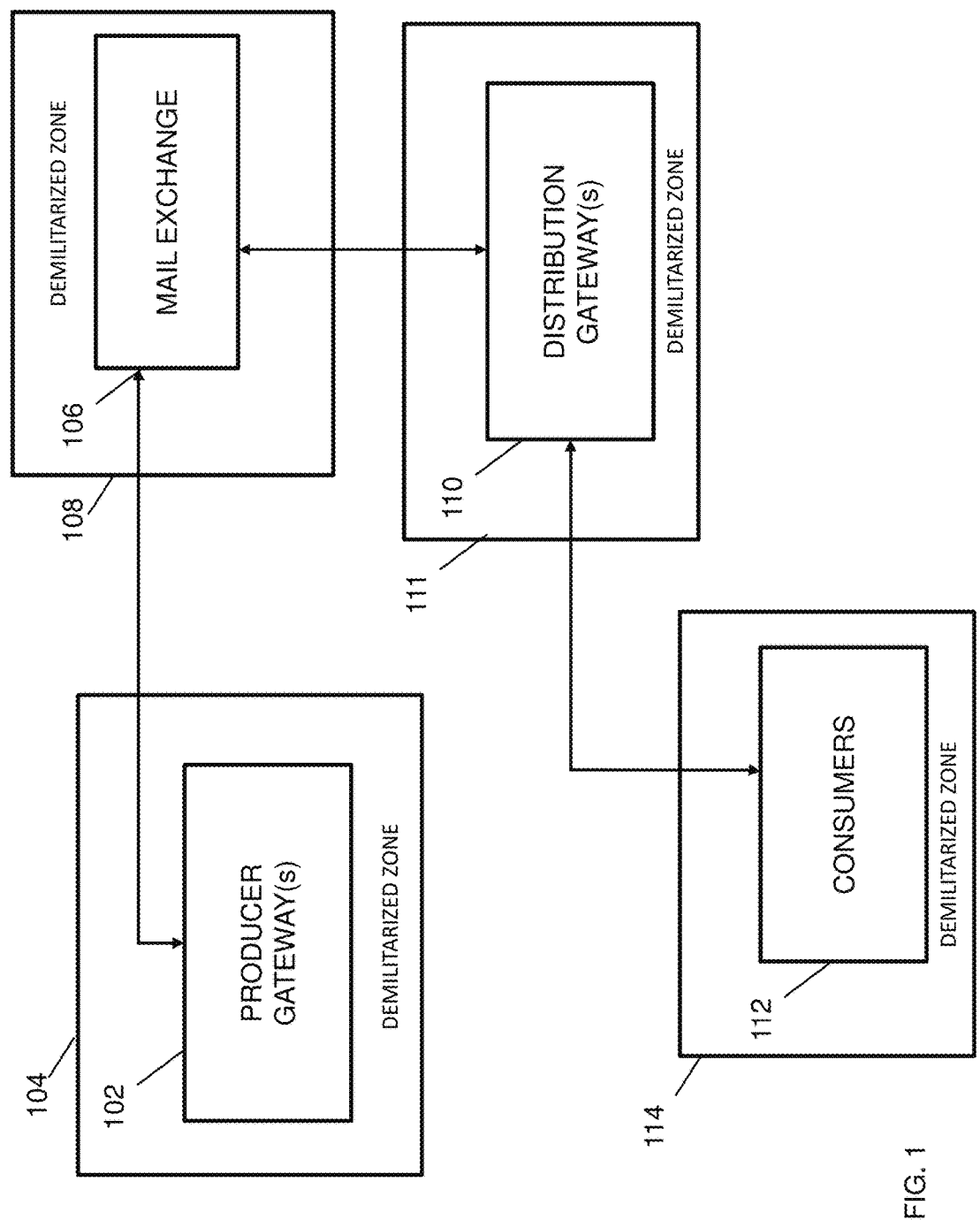
FIG. 1 is a high-level diagram illustrating an exemplary configuration of a code processing system in accordance with one or more implementations of the present application.

Referring now to the figures, FIG. 1 is a block diagram illustrating a simplified view in accordance with an example implementation of the present application. One or more producer gateways (PG) 102 can be configured as a set of components (including, but not limited to Java services, message oriented middleware, SecureFTP, caches, PERL scripts, FTP servers, databases, and web interfaces) that are deployed in an intranet and a producer gateway demilitarized zone 104 (or perimeter network, as known in the art) associated with the producer gateway 102. Content is passed to and from the producer gateway 102 to a mail exchange 106, which can be located or otherwise be associated with a mail exchange demilitarized zone 108. Content is further passed to and from the mail exchange 106 to and from a distributor gateway 110, including via the distributor gateway demilitarized zone 111, which sends and receives content to and from consumers 112 (including via the consumer's demilitarized zone 114).

Figure 2:
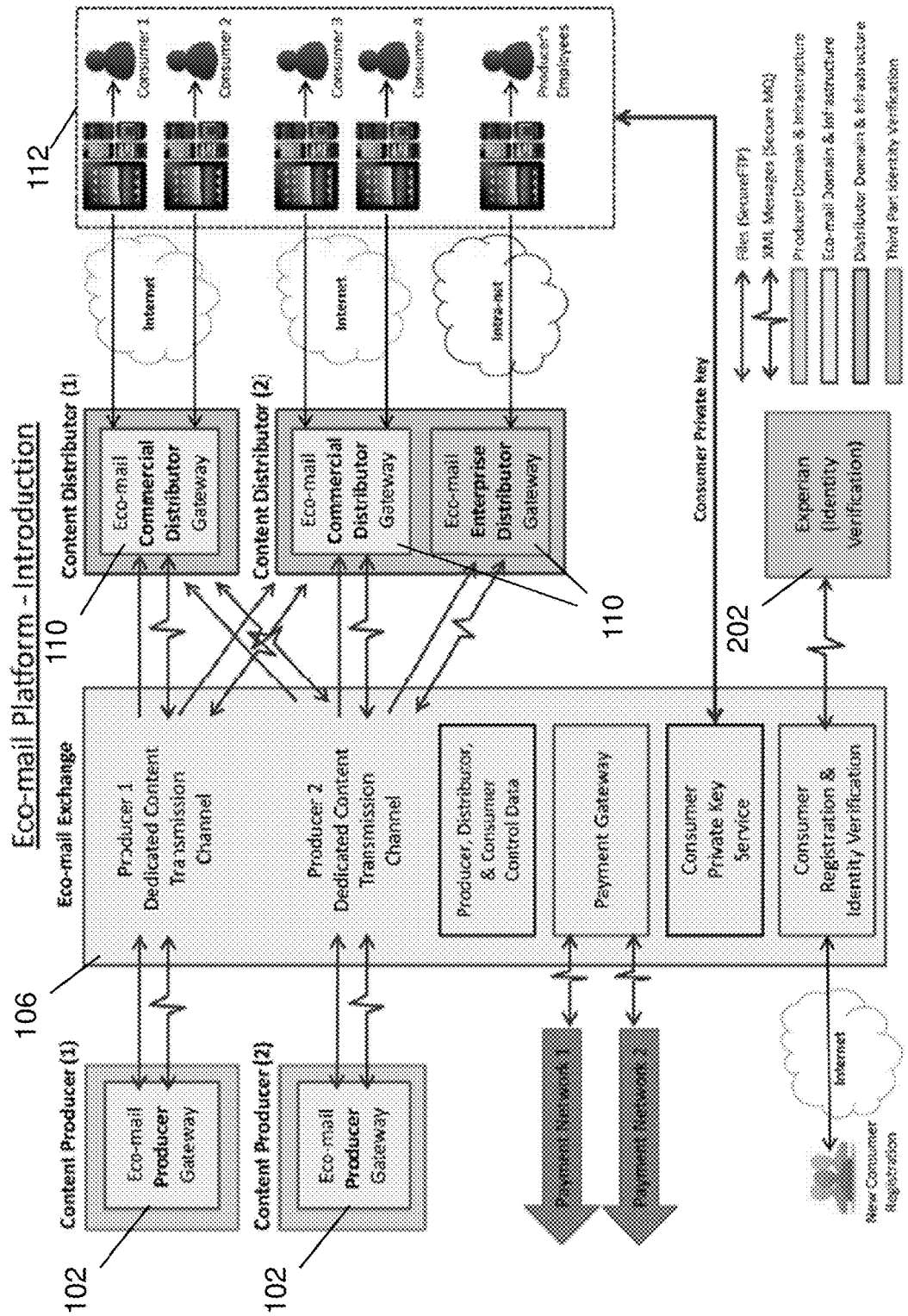
FIG. 2 illustrates a high level implementation of the present application and includes components illustrated in FIG. 1.

FIG. 2 illustrates a high level implementation of the present application and includes components illustrated in FIG. 1. Certain of the components of the present application illustrated in the drawings can take on multiple roles and operate differently in particular contexts. For example, a producer of content can also be a distributor of content by hosting one or more distributor gateways (distributor gateway 110). In such case, the producer can store encrypted content in a local repository, and send an encrypted link file (e.g., providing delivery instructions) to the mail exchange 110.

In accordance with the high-level implementation of the present application shown in FIG. 2, producers of content register content, such as documents, to send to consumers using a web based administration interface that can be provided by the producer gateway 102. The content is packaged, for example, by the producer gateway 102 and sent to and received by the mail exchange 106. The mail exchange 106 is configured to receive and route the content to the distributor gateway 110, which operates to deliver the content to the consumers.

In one or more implementations, a producer can host multiple producer gateways 102. For example, a bank implements separate gateways 102 for its mortgage division and its credit card division, respectively. Multiple gateways 102 provided by or within a single producer have a benefit of being able to share infrastructure, for example, depending on content transmission volume. Furthermore, the producer gateway 102 can transmit encrypted and unencrypted content to the consumer. In an implementation, the producer controls which document is sent in the clear (i.e., unencrypted) and which document is sent in an encrypted form, by marking the appropriate document level configuration settings in a web site interface provided by the producer gateway 102. As noted herein, the mail exchange 106 can receive content from the producer gateway 102, and deliver the content to the consumers 112 through the distributor gateway 110. Furthermore, the mail exchange 106 can be configured to be a master record holder, including with regard to interactions between the producers, distributors, and consumers.

Continuing with reference to FIG. 2, a consumer device registers with the mail exchange 106 via a new consumer registration process that can be hosted by the mail exchange 106. In one or more implementations, information submitted by the new consumer is verified, for example, by identity verification service 202 provided by EXPERIAN. Thereafter, the registration process completes by the mail exchange 106, which assigns the consumer a universally unique identifier ("UUID"), and a public/private key pair for encrypting/decrypting content. In one or more implementations, the mail exchange 106 hosts an isolated private key infrastructure to provide the consumers with private keys to decipher encrypted content sent by the producer. The mail exchange 106 can also host or otherwise interact with a payment gateway that enables consumers to make payments through a number of payment networks. Consumers can send payment instructions via the distributor gateway 110 to the mail exchange 106. Further, the mail exchange 106 can provides data transmission application services deployed on dedicated one or more virtual local area networks for each respective producer to ensure data transmission security and isolation. The mail exchange 106 symmetrically encrypts and then stores all consumer, producer, and distributor information in one or more databases storing various control data.

Continuing with reference to FIG. 2, the distributor gateway 110 can be configured as a set of components similar to the components described above in connection with the producer gateway 102. Further, the distributor gateway 110 can be deployed in the demilitarized zone and an intra-net of a respective content distributor. In one or more implementations, the distributor gateway 110 receives content from the mail exchange 106, and delivers the content before passing back one or more delivery state messages to the mail exchange 106.

In one or more implementations, there are two types of distributor gateways 110. One is an enterprise distributor gateway, which is meant for distribution of enterprise content (such as W2s, code of conduct, digitized mail from mail room, B-2-B digital content). The enterprise distributor gateway 110 is useful for internal employees of a producer, and can support key features such as content forwarding with audit trail and audit and compliance access to encrypted content. The second type of distributor gateway 110 is a commercial distributor gateway 110, which is meant to distribute content to customers of an enterprise. In this implementation, a customer, for example, who is registered as a consumer with the mail exchange 106, sends and receives via one respective distributor gateway 110 at a time. In an example implementation, consumers (e.g., employees of a producer) receive content by logging into an on-line user interface, such as a mobile application or web-based interface, and authenticates with the distributor gateway 110.

Preferably, content that is stored in at the distributor gateway 110 is encrypted, and is decrypted at the consumer device/website during run-time. Once the content is delivered and received, the distributor gateway 110 transmits various forms of information, such as one or more content receipt and delivery confirmation messages and action logs to the producer through the mail exchange 106.

Figure 3:
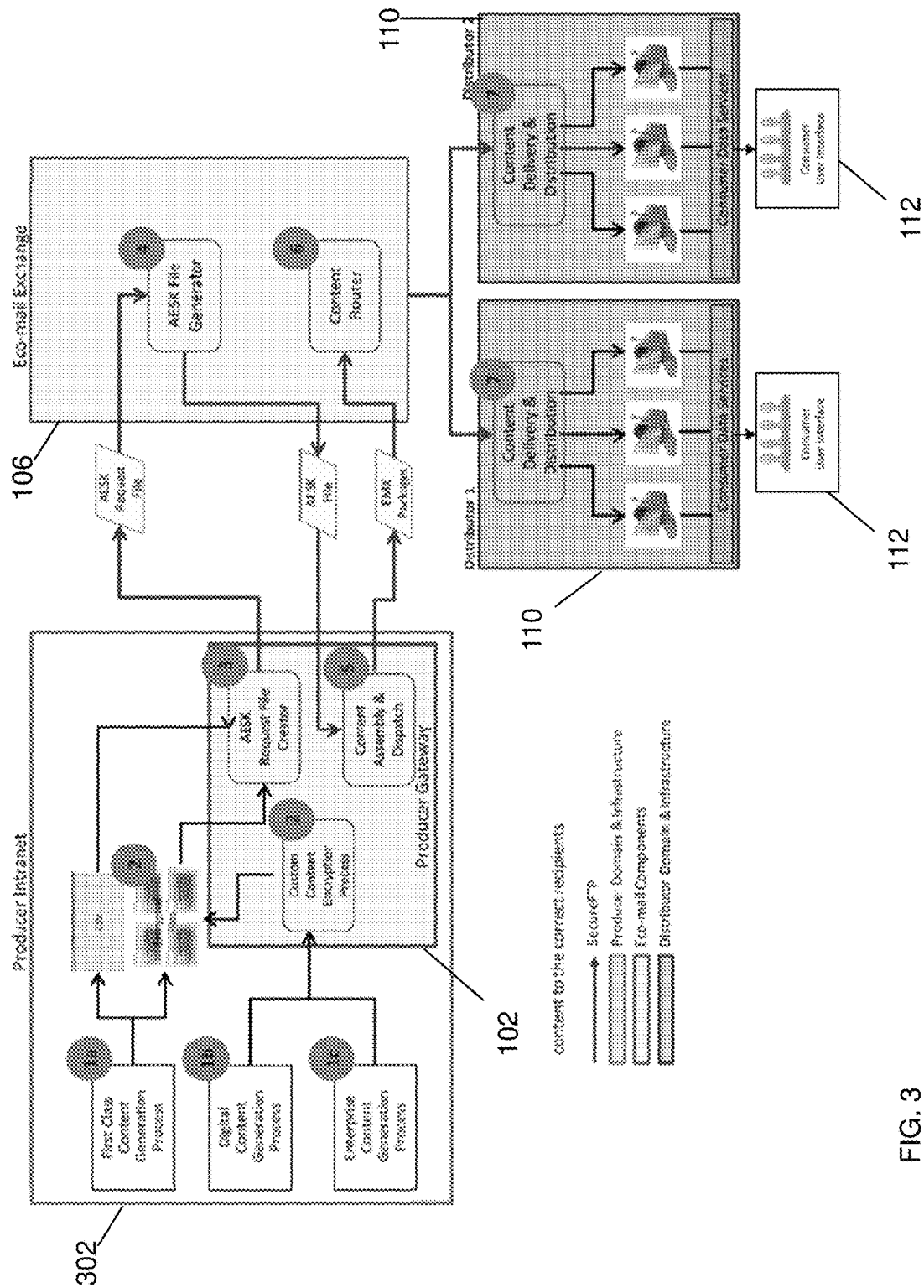
FIG. 3 illustrates an example implementation and flowchart illustrating an example process steps associated with the present application and in accordance with content generation and transmission.

FIG. 3 illustrates an example implementation and flowchart illustrating an example process steps associated with the present application and in accordance with content generation and transmission. Several of the logical operations described herein can be implemented (1) as a sequence of computer implemented acts or running program modules and/or (2) as interconnected machine logic circuits or circuit modules. The implementation is a matter of choice dependent on the requirements of the device (e.g., size, energy, consumption, performance, etc.). Accordingly, the logical operations described herein are referred to variously as operations, steps, structural devices, acts, or modules. Moreover, one or more of these operations, steps, structural devices, acts and modules can be implemented in software, in firmware, in special purpose digital logic, and any combination thereof. Furthermore, more or fewer operations can be performed than shown in the figures and described herein. These operations can also be performed in a different order than those described herein.

In the example implementation shown in FIG. 3, producer intranet 302 is shown that includes three different sources of content and corresponding processes for generation thereof: first class (e.g., content originating from received or sent first class mail), digital content (e.g., content generated in a digital context, such as within a computing device), and enterprise content (e.g., content generated at the enterprise level) (step 1). The digital content can be encrypted in a content package, such as using a symmetric key, and each key can be unique to each respective piece of content for each transmission (step 2). At step 3, a selection is made for the format of the content to be transmitted to one or more consumers. In one or more implementations, the options include sending encrypted content, unencrypted content, and/or link (e.g., a hyperlink) to encrypted content.

Continuing with reference to the example implementation shown in FIG. 3, at step 4 an asymmetrically encrypted symmetric key ("AESK") is created at the mail exchange 106 along with transmission tokens. The asymmetrically encrypted symmetric key can be created using the public key of the recipient consumer. At step 5, content assembly and dispatch occurs for the package, and a custom file containing, for example, the encrypted content or an encrypted link to the actual content at the producer and unencrypted public meta-data in clear text. At step 6, one or more copies of the package are delivered to one or more respective consumers at one or more respective distributors via a content router at the mail exchange 106. At step 7, the content delivery and distribution process associated with the distributor gateway 110 functions to deliver the content to the correct recipient(s).

Figure 4:
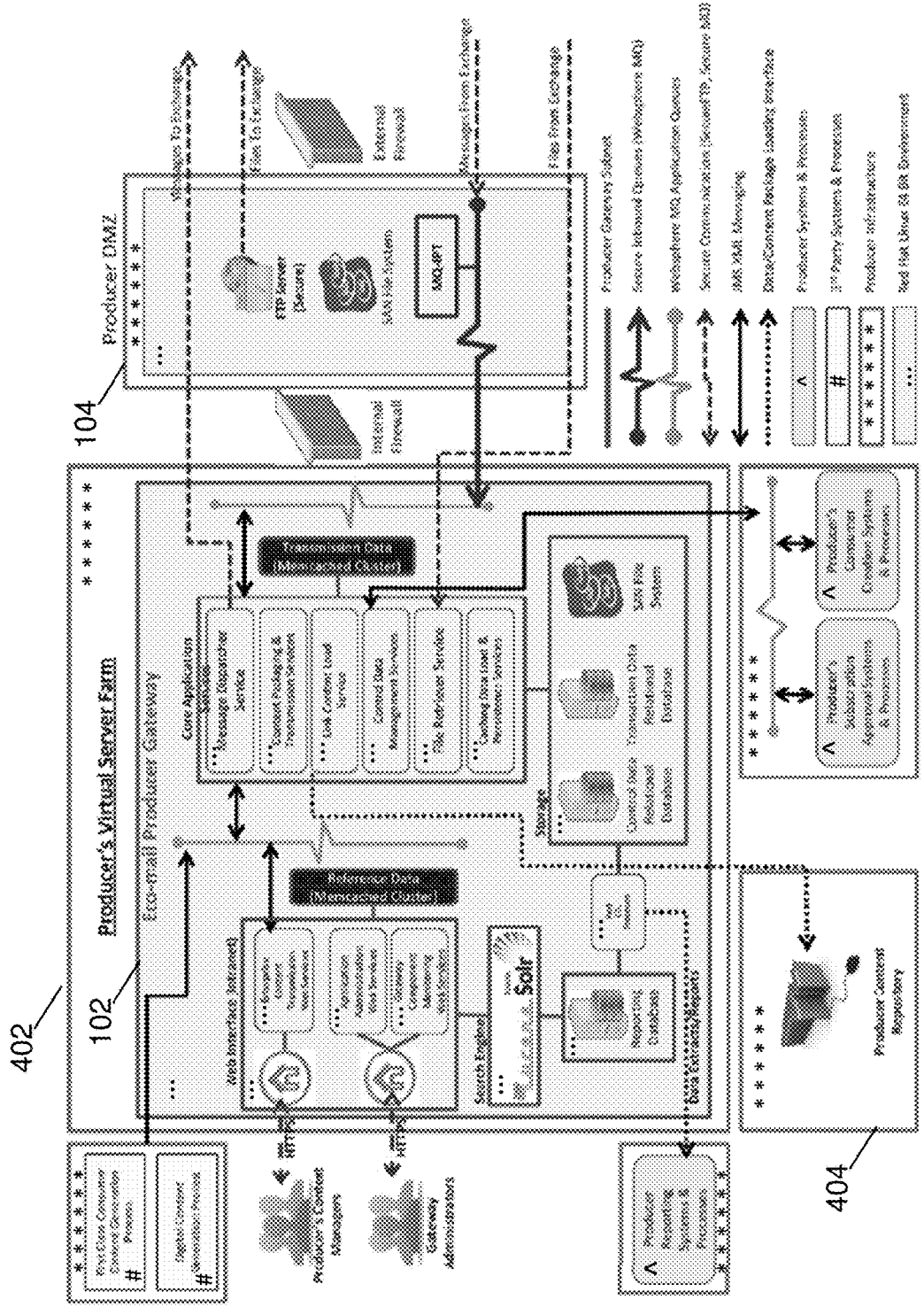
FIG. 4 is a block diagram that illustrates an example high level architecture of a producer gateway.

FIG. 4 is a block diagram that illustrates an example high level architecture of the producer gateway 102, in accordance with an example implementation of the present application. In one or more implementations, a producer server farm 402 is implemented that includes the producer gateway 102 includes one or more core application services that can be written, for example, in JAVA utilizing the Spring (e.g., version 3.0) framework. These components can communicate with IBM's Websphere MQ Middleware, for example, using JMS-XML Messaging. In one or more implementations, SecureFTP is implemented to transfer files securely to and from the mail exchange 106. In one or more implementations, a relational database management system, such as MySQL, is used to store data, and high-speed data access is provided, for example, via Memcached Cluster. Depending upon one or more producer preferences, components associated with the producer gateway 102 can be deployed on physical and/or virtual servers, such as within an isolated subnet.

Continuing with reference to FIG. 4, two web-based interfaces can be used for operators and/or administrators. For example, producer initiated transmissions and producer gateway administration web sites can be provided and made available for respective users. Preferably, both producer initiated transmission and producer gateway administration web sites prevent cross site scripting, and secure communication is supported, such as over an HTTPS connection. Particular user authentication and single sign on is integrated with one or more of the producer's preferred authentication mechanisms. In one or more implementations, the producer initiated transmissions web sites are applicable for a particular user role: "Administrator." The producer gateway administration web sites are applicable for two roles: "Administrator", and "Read Only". Preferably, users accessing these two web interfaces are aliased into one of these roles. Furthermore, the producer initiated transmissions web sites can enable designated operators to send content to consumers on an ad hoc basis. In such case, document(s) that are included in these transmissions are encrypted with a unique symmetric key, for example, that is generated using JAVA'S Crypto Library and using the asymmetrically encrypted symmetric key 256 bit algorithm. Preferably, symmetric keys are never reused.

Continuing with reference to the high-level architecture implementation associated with a producer gateway 102 in FIG. 4, one or more producer gateway administration websites enable a designated producer gateway administrator to perform various functions, such as to monitor transmissions, monitor producer gateway 102 components, run reports and extract, and manage various producer gateway 102 configurations.

As can be appreciated and described herein, the producer gateway 102 is capable of transmitting encrypted and unencrypted content to a consumer 112. In addition, the producer gateway 102 can be configured to send linked content to a consumer 112. Selections of one or more of these configurations can be set at individual document level in the producer gateway administration web site. In one or more implementations, the process of sending linked content allows the producer to maintain the encrypted content package in a secured repository 404 within the producer's domain. In such cases, the producer gateway 102 symmetrically encrypts the link to the encrypted content package, and sends that link for delivery to the mail exchange 106. The symmetric key used to encrypt the link can be the same key used to encrypt the corresponding encrypted content package. Extract, transform and load processes, such as via PERL, can operate to extract data into a reporting database and deliver reports in extracts, such as in one or more comma separate values ("CSV") and ADOBE PDF files, to secure destination directories and reporting systems outside of the subnet of the producer gateway 102.

For example, a producer hosts an enterprise distributor gateway, and the producer gateway 102 creates two content packages. A first content package contains the (actual) encrypted content, and a second content package is an encrypted link to the actual encrypted content package. The first encrypted content package is loaded into the producer's secure repository 404, such as via secureFTP, from the producer gateway 102, and the second content package (containing the link) is sent via the mail exchange 106 to the enterprise's distributor gateway 110. In this way, the first encrypted content package in maintained securely in a repository 404 of producer gateway 102.

Figure 5:
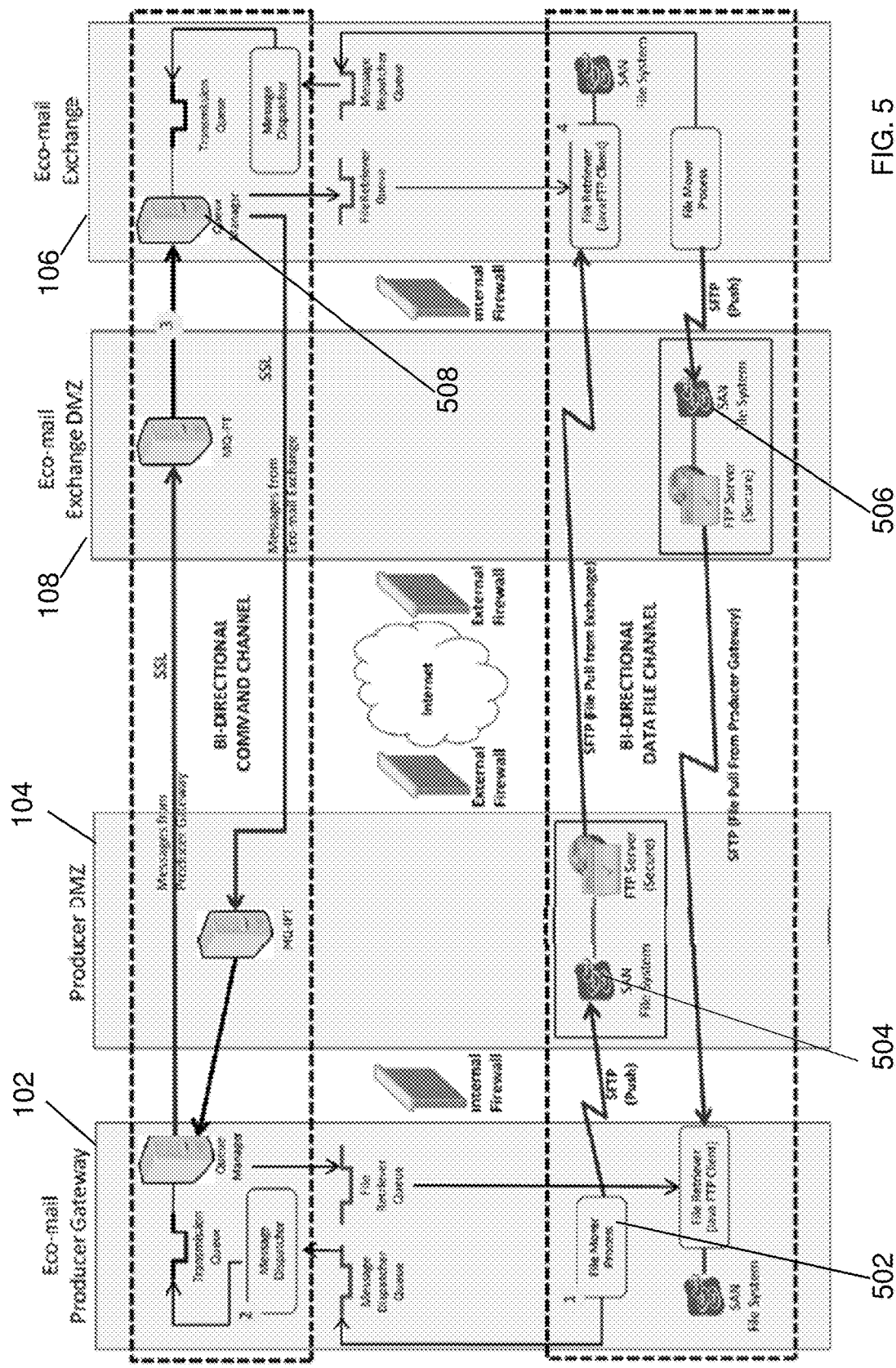
FIG. 5 illustrates an example implementation and flowchart illustrating an example process steps associated with the present application and in accordance with communication between producer gateway and mail exchange.

FIG. 5 illustrates an example implementation and flowchart illustrating an example process steps associated with the present application and in accordance with communication between producer gateway 102 and mail exchange 106. In the example implementation shown in FIG. 5, transmissions occur over a command (e.g., Websphere MQ) channel and a data file channels (e.g., secure FTP). In an implementation of the present application, all communication occurring between the mail exchange 106 and the producer gateway 102 occurs over these two channels. For communication between the producer gateway 102 and mail exchange 106, both of these communication channels are bi-directional.

In an example operation, a file mover component 502 operates to push a content file into a storage area network ("SAN") file system 504 associated with or in the producer gateway demilitarized zone 104, for example, via SecureFTP (step 1). The file mover component 502 sends a message, for example, via SecureMQ, to a file retriever component in the destination network. The message contains the file name and location in the sender's DMZ. The File Retreiver component in the destination network will pull the file across over a secure FTP connection and store the file in a SAN file system 506 associated with the exchange mail demilitarized zone 108 (step 2). At step 3, an internet pass-through component, such the Websphere MQ IPT, is deployed in the producer gateway demilitarized zone 104 to pass the incoming SecureMQ message(s) into a queue manager 508 in the respective destination network. The queue manager 508 then places the message(s) on to one or more appropriate internal application queues. Thus as shown and described with reference to the example implementation in FIG. 5, secured messaging and data file transmission occur between producer gateway 102 and mail exchange 106 as a function of the command and data file channels, respectively.

Figure 6:
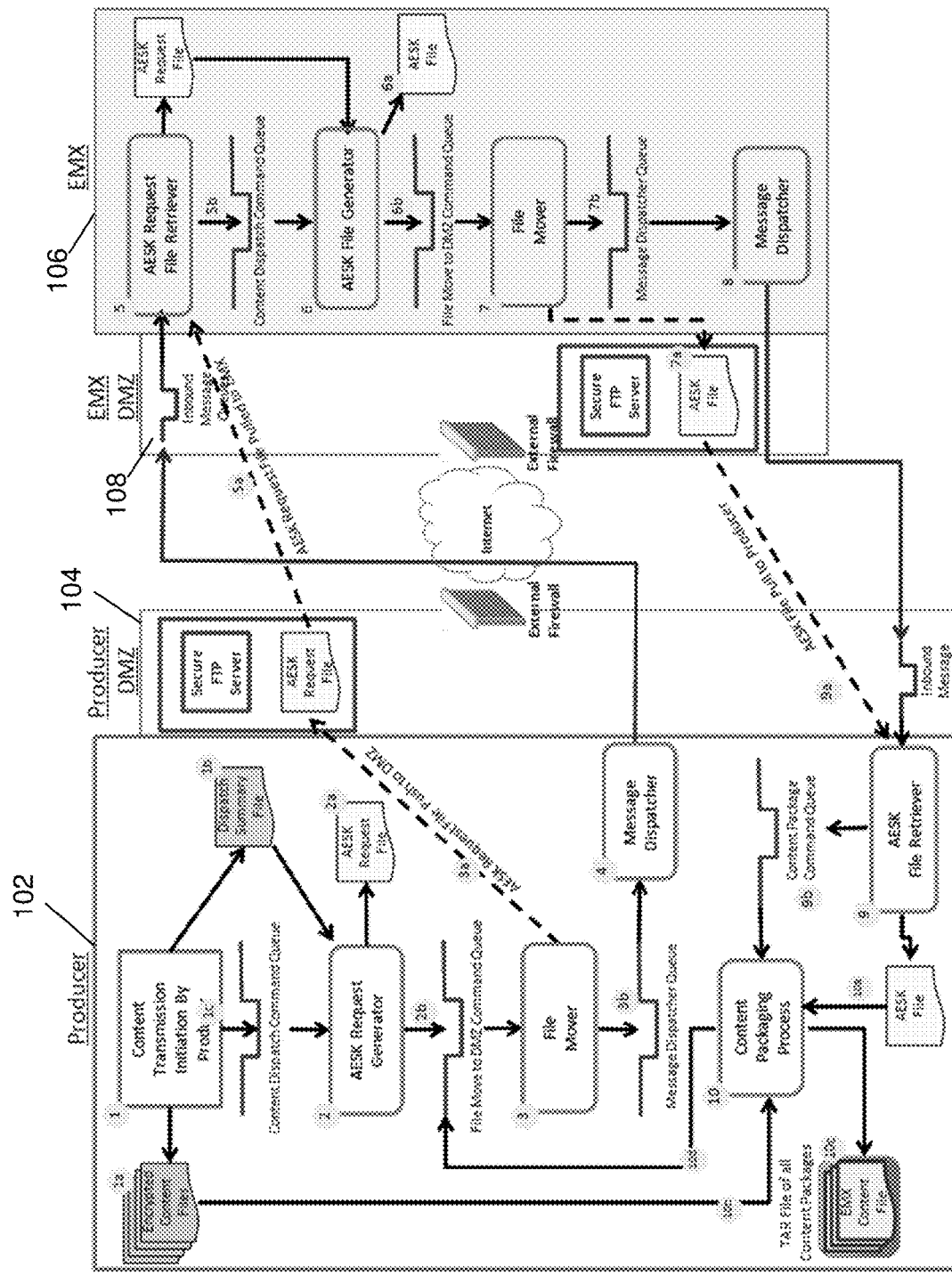
FIG. 6 illustrates an example implementation and flowchart illustrating an example process steps associated with the present application and in accordance with generation and distribution of asymmetrically encrypted symmetric key(s)

FIG. 6 illustrates an example implementation and flowchart illustrating an example process steps associated with the present application and in accordance with generation and distribution of asymmetrically encrypted symmetric key(s). At step 1, a producer initiates a content transmission process, which can use, for example, any of three different mechanisms: a commercial mail generator; an enterprise mail dispatch; and digitized incoming mail. These respective dispatch mechanisms can be configured to create one or more of symmetrically encrypted content files, a batch initiation detail file, and a XML command message that is placed on a content dispatch command queue to initiate content transmission. An asymmetrically encrypted symmetric key request generator process (ARGP) receives a message from the content dispatch command queue. In one or more implementations, the message contains the location of the encrypted content files, and the location of a dispatch summary file (step 1b).

Continuing with reference to the example process steps shown in FIG. 6, for each record included in the dispatch summary file, the asymmetrically encrypted symmetric key request generator process (ARGP) retrieves a respective subscription identifier from a data store associated with the producer gateway 102. Moreover the asymmetrically encrypted symmetric key request generator process (ARGP) can operate to create a unique tracking identifier for each record. The subscription identifier, tracking identifier and the unique symmetric key used to encrypt the content package are added on to an asymmetrically encrypted symmetric key request file. Once the entire file is built, the ARGP transmits a message to a file mover component (e.g., 502) to move the file into the producer gateway demilitarized zone 104 (step 2). At step 3, the file mover component moves the asymmetrically encrypted symmetric key request file into the producer gateway demilitarized zone 104, and transmits a dispatch command message on the message dispatcher's queue (step 3b). Thereafter, the message dispatcher places a message on a secure queue (e.g., a Websphere MQ queue) of the mail exchange 106 with the asymmetrically encrypted symmetric key file location (step 4).

Continuing with reference to the example process steps shown in FIG. 6, at step 5 an asymmetrically encrypted symmetric key request file retriever component receives the message sent by the producer gateway 102, and accesses the file from the producer gateway demilitarized zone 104 into a domain of the mail exchange 106. The AESK request file retriever component further places a message on the AESK file generator's queue to process the asymmetrically encrypted symmetric key request file and to generate an asymmetrically encrypted symmetric key file. At step 6, an AESK file generator (AFG) component creates an asymmetrically encrypted symmetric key file that includes, for example, the tracking identifier, the transmission identifier, and an AESK package for each record on the asymmetrically encrypted symmetric key request file. In one or more implementations, the transmission identifier is formatted as a 36 character universally unique identifier ("UUID") that is generated by the AESK file generator process. The UUID operates as a token that provides authorization for the producer to send a single piece of content to the consumer. The AESK file generator process then places a message on a file mover queue in the mail exchange 106 for moving the asymmetrically encrypted symmetric key file to the mail exchange demilitarized zone 108 (step 6b). At step 7, a file mover component associated with the mail exchange 106 moves the asymmetrically encrypted symmetric key file to the mail exchange demilitarized zone 108 that is "facing" the producer gateway 102, and a message is sent to a message dispatcher component to send a file retrieval message to the producer gateway 102 (step 7b).

Continuing with reference to the example process steps shown in FIG. 6, at step 8, the message dispatcher component at the mail exchange 106 sends a secure message, such as via WebSphere MQ, to the AESK file retriever component to get the asymmetrically encrypted symmetric key file from the mail exchange demilitarized zone 108. At step 9, the AESK file retriever component obtains the file from the mail exchange demilitarized zone 108 and places the file to the domain associated with the producer gateway 102, and transmits a message on a content package command queue (step 9b). At step 10, a content packaging component within the producer gateway 102 reads the asymmetrically encrypted symmetric key file, the encrypted content files, and configurations, and creates a mail exchange content package. In the event that the producer configuration is set to sending a link, then the content packaging process stores the content package in the producer's secure document repository 504 (FIG. 5), and the content packaging process encrypts the link to the respective content using the same symmetric key used to encrypt the actual content package. The content packaging process then compacts or compresses all mail exchange content files (or linked content files), for example, into a TAR file, and transmits commands to the file mover component to start the dispatch process to mail exchange 106.

FIG. 6 illustrates an alternative implementation and flow-chart illustrating an example process steps associated with the present application and in accordance with content delivery to one or more consumers from one or more producers. In the alternative implementation shown in FIG. 7, a producer does not send an encrypted content file to a distributor, and instead creates the content package and stores the actual content package file ("CPF") in the producer's own domain. Also as set forth in FIG. 7, producers create a corresponding encrypted link file to the actual content file.

Figure 7:
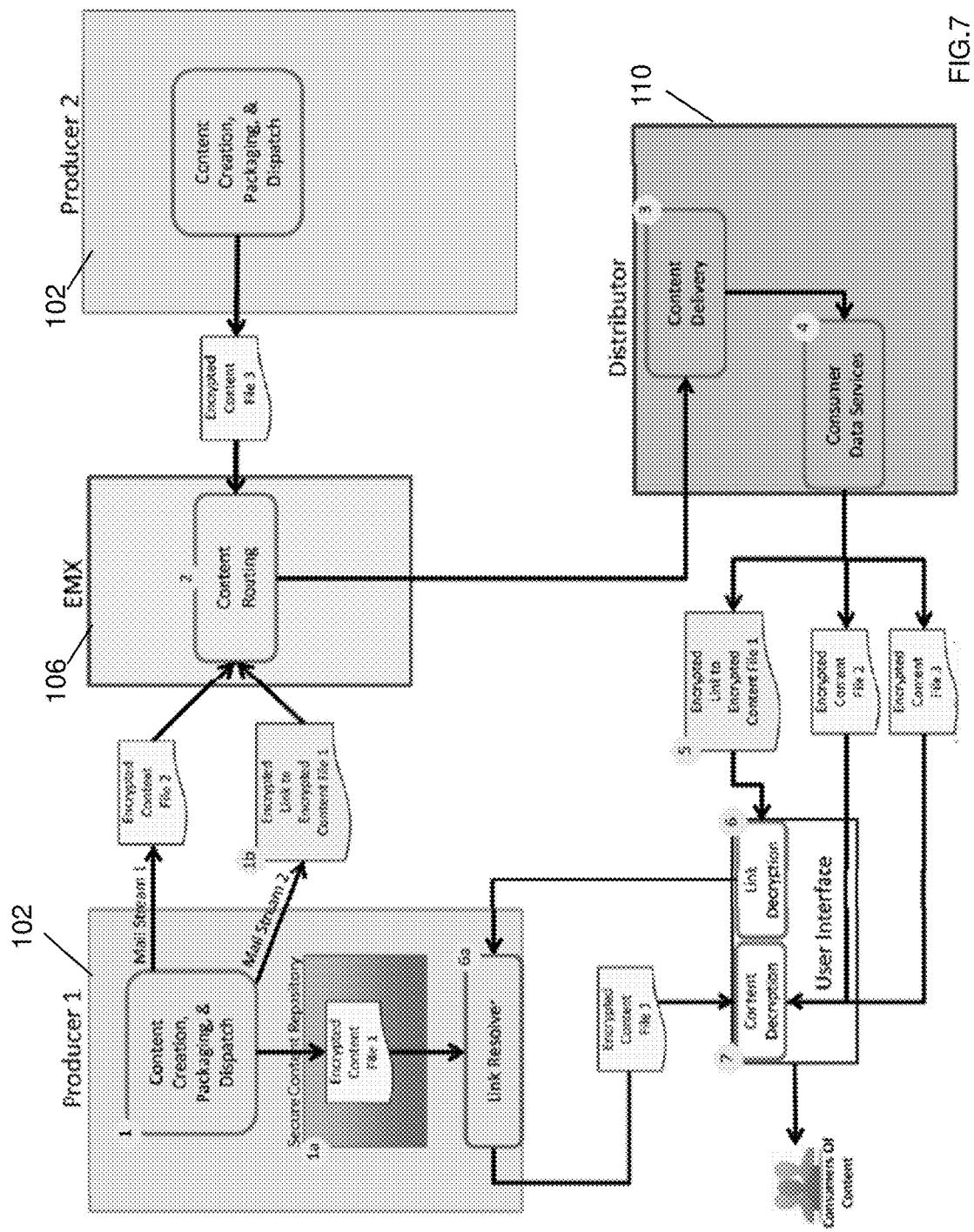
FIG. 7 illustrates an alternative example implementation and flowchart illustrating an example process steps associated with the present application and in accordance with generation and distribution of asymmetrically encrypted symmetric key(s)

In accordance with the process steps set forth in FIG. 7, the producer stores the content file package and encrypts the file package with a symmetric key. The producer uses the same symmetric key that was used to encrypt the corresponding content package to encrypt a file containing a link. The encrypted link file is transmitted sent to the consumer via the mail exchange 106. These procedural steps ensure an additional layer of content security, and prohibit a distributor from scanning or otherwise reading any information of the actual content package. Moreover, this also provides functionality associated with distributing enterprise content to the employees of a producer.

In accordance with the implementation shown in FIG. 7, the producer can send any document via a link by implementing this configuration in the producer gateway website for a particular document. Moreover, the present application provides flexibility to enable the configuration to be changed any time, for example, for subsequent mail streams created by the producer in the future. In one or more implementations, once a configuration is set, it applies to all recipients of the document.

As can be appreciated, with regard to the security associated with the teachings herein, there are minor differences between the actual encrypted content file and the encrypted link file. The encrypted section of the encrypted link file simply contains the symmetrically encrypted hypertext transport protocol ("HTTP") link, instead of the encrypted content itself. The encrypted link file is treated by the mail exchange 106 and distributor gateway 110 in the same way as any content file sent by the producer. In one or more example implementations, the producer(s) generate content, package it and dispatch (step 1). The encrypted package is transmitted to the mail exchange 106 (step 2), where it is transmitted to the distributor gateway 110 for delivery (step 3). Consumer data services are referenced and used by the distributor gateway 110 to transmit the encrypted files to consumers 112 (steps 4 and 5).

Continuing with reference to FIG. 7, decryption is performed via a user interface associated with consumers 112 (steps 6 and 7). For linked content files, the user interface can perform double decryption. The user interface first decrypts the linked content file to get the location of the encrypted content file, and then makes a secured request, such as via HTTPS, using the provided link to download the encrypted content file. For example, the producer authenticates the request and transmits the actual encrypted content file to the consumer 112. Once the file is received via the user interface, a second decryption routine can thereafter be performed to decrypt the content and provide the content to the end user.

The present application is configured to be well-integrated with one or more third party services, including robust content generation and management products and processes, such as provided by XENOS. Other functionality that can be well-integrated, for example, includes third party tools for physical mail-room digitization and integration (e.g., for enterprise-wide content scanning and dispatch), and third party tools for ad hoc enterprise and commercial dispatch are well integrated with the present application, such as via the producer gateway 102.

Figure 8A:
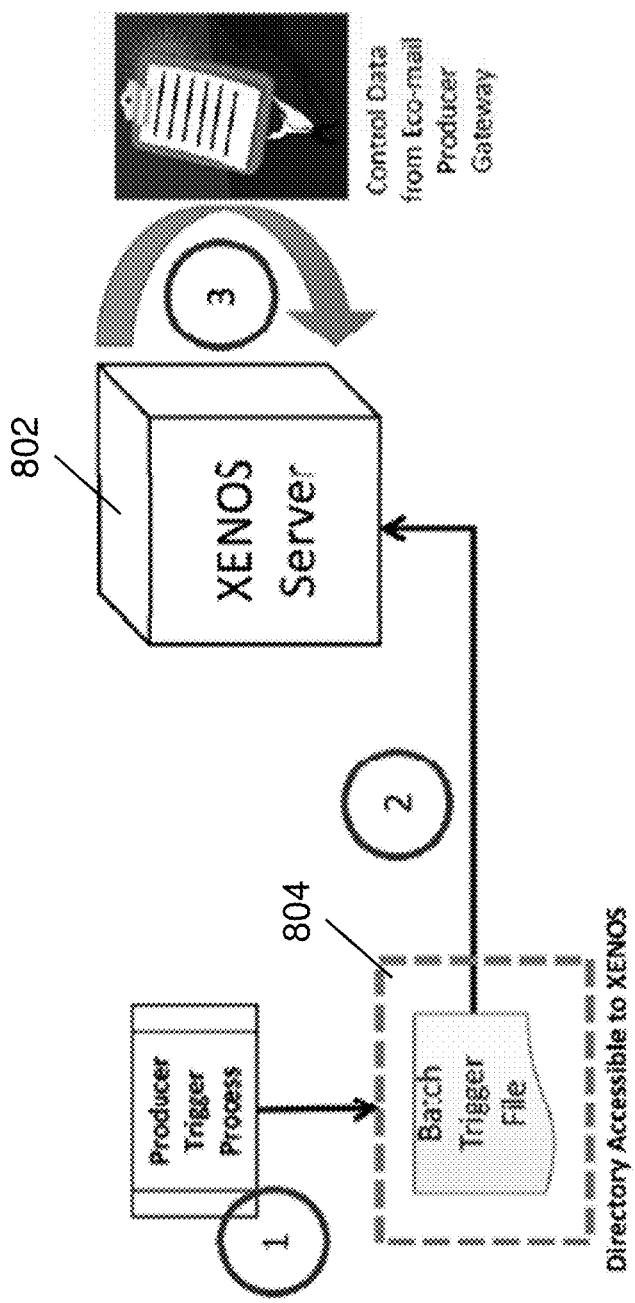
FIGS. 8A-8C illustrate an example implementation of the present application that includes XENOS integration with a producer gateway.
Figure 8B:
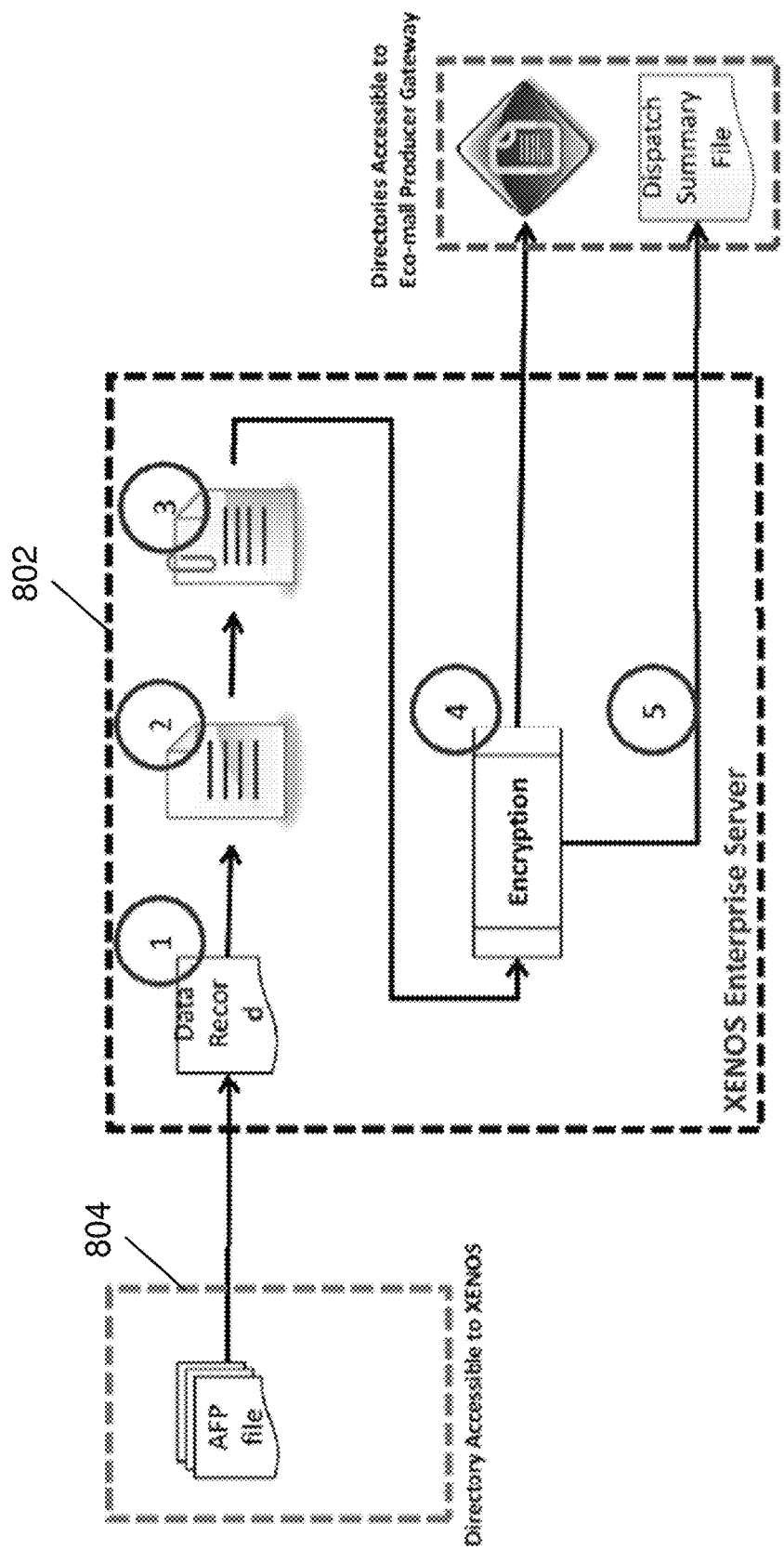
Figure 8C:
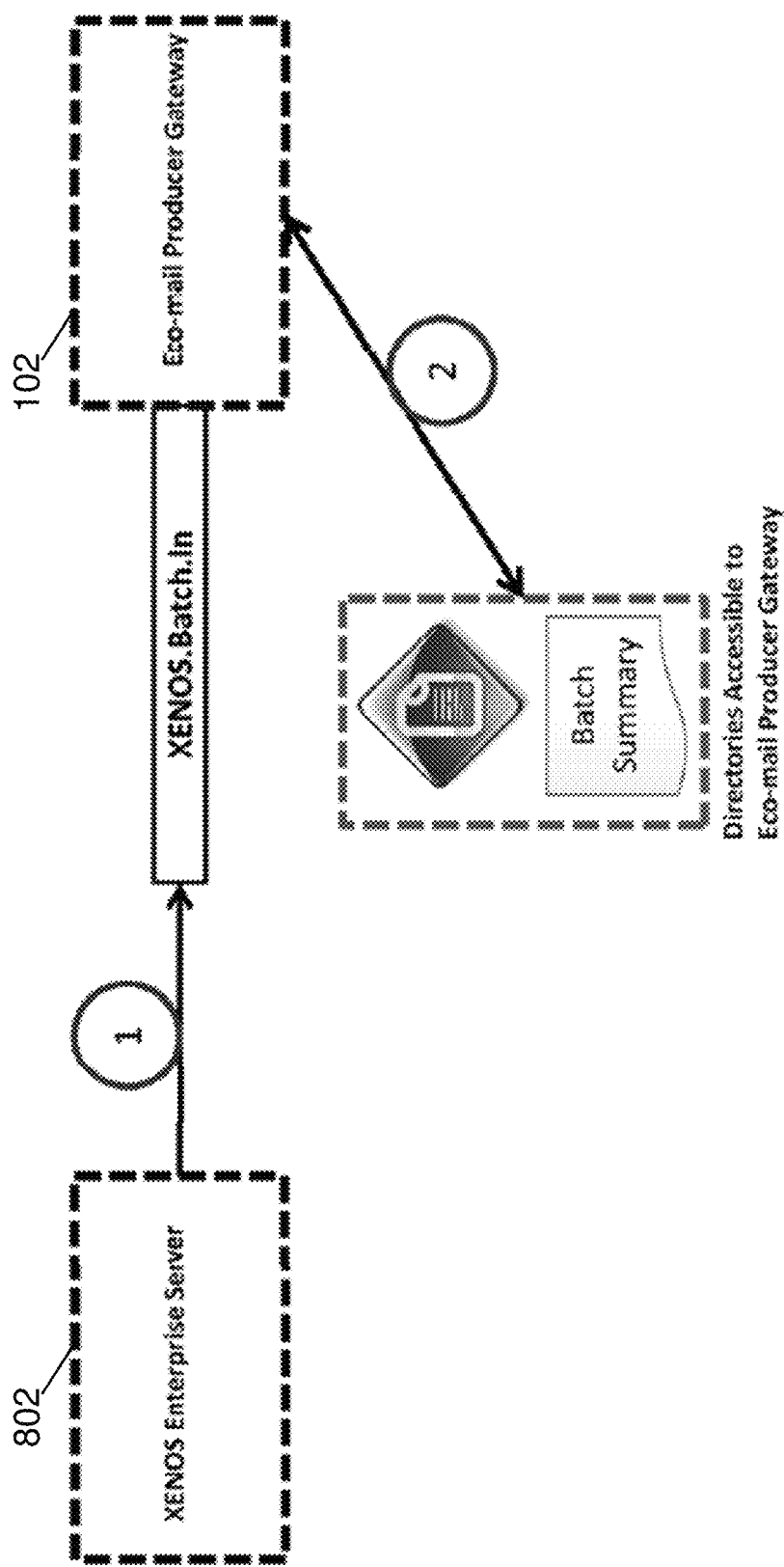

FIGS. 8A-8C illustrate an example implementation of the present application that includes XENOS integration with producer gateway 102, and includes the producer gateway 102 triggering a process associated with a XENOS application, processing information at the XENOS server 802, and the process of the XENOS server handing off information to the producer gateway 102, respectively.

Referring to FIG. 8A, a producer creates a file such as formatted as an advanced printing file ("AFP"), and creates a batch trigger file, which is transmitted and/or otherwise saved to a predetermined directory 804, which is accessible to the XENOS server 802 (step 1). In one or more implementations, the producer indicates the identifier for the document being transmitted in the respective batch run, and the document identifier is used as part of the file name. The producer can drop multiple trigger files at one time and maintain a high degree of efficiency. The XENOS Server 802 executes one or more processes (e.g., a file daemon) that periodically review the contents of the directory and, upon a process of discovering the trigger file, and batch processing is instituted (step (2). The XENOS Server 802 further executes one or more processes that read the document identifier from the file name, such as from the first 36 characters of the file name, and that validate the documents against an internal reference, such as a lookup table, of valid document identifiers. In one or more implementations, the internal reference (e.g., a lookup table) is provided to the XENOS server via one or more components described herein, such as via the producer gateway 102. Respective naming conventions, meta-data, document identifiers or the like are monitored and managed, including to maintain compatibility between components shown and described herein, and the XENOS server.

FIG. 8B illustrates example processing steps in accordance with a XENOS server 802 following receipt of the batch trigger file, described above with reference to FIG. 8A. At step 1, records of the batch trigger file are read and the AFP data record is read. At step 2, a PDF file (or other suitably formatted file) is distilled in accordance with the document identifier and, and data is inserted ("injected") into the document. Thereafter, the document is read and private meta-data is created and, for example formatted in JavaScript Object Notation ("JSON"), which is inserted via XMP API into the PDF Document (step 3). At step 4, a random symmetric key (e.g., AES 256) is generated, for example, using the Java Crypto library for each data record, and the PDF document is encrypted with the symmetric key. The encrypted document is stored in a specific location, for example, on disk which is accessible to the producer gateway 102. Thereafter, at step 5, a summary record is constructed for each respective PDF, and written to a dispatch summary file, which may be specific to each respective batch.

Referring now to FIG. 8C and continuing with the example process shown in FIGS. 8A-8C, once an entire batch has been processed, a message (a package assembly initiation message) is placed on a special queue, such as a Websphere ActiveMQ queue exposed by the producer gateway 102 (FIG. 8C, step 1). Thereafter, the producer gateway 102 retrieves the package assembly initiation message, for example, from an inbound queue, and the producer gateway 102 begins a process for content assembly (step 2). The content assembly process includes communication with the mail exchange gateway 106 (not shown), and the encrypted key package is received. Thereafter, the encrypted PDF file is combined with unencrypted (e.g., "public") metadata and a new mail exchange 106 file is created. Once all files associated with the batch summary are ready, the producer gateway 102 proceeds to transmit the encrypted packages to the mail exchange 106.

Figure 9:
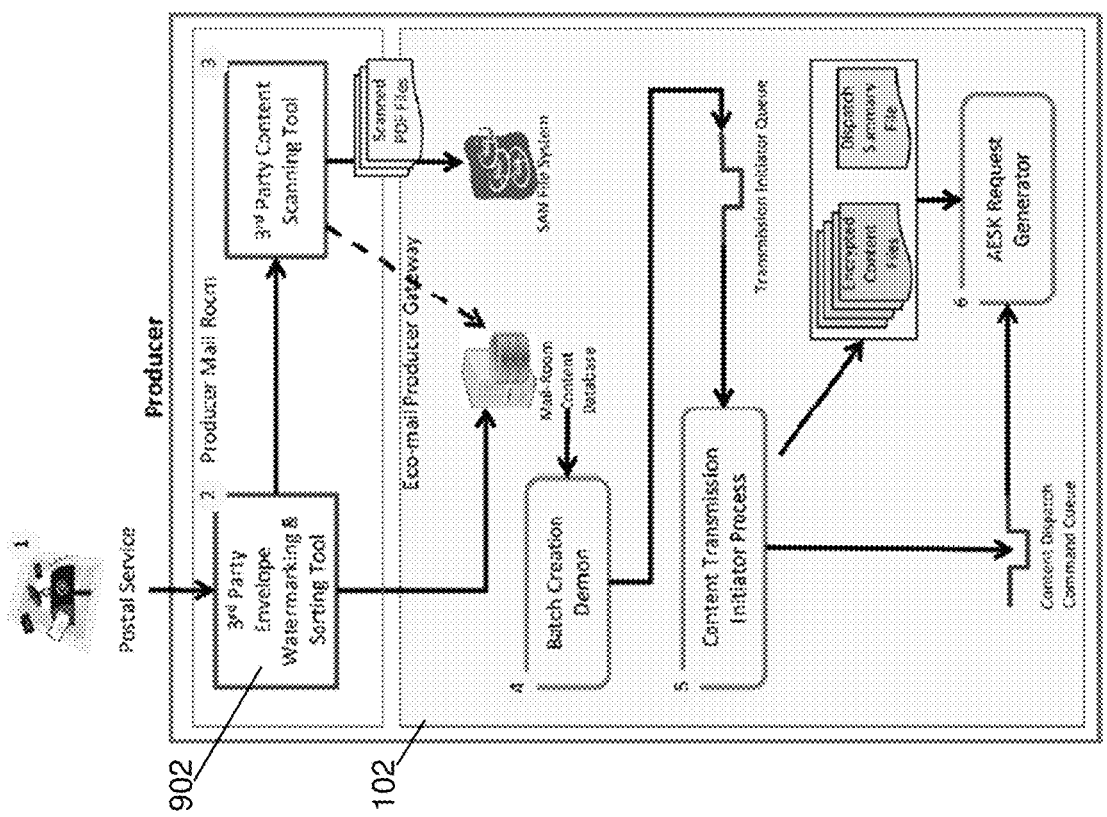
FIG. 9 shows an example configuration and corresponding process steps representing integration of features of the present application with mail-room digitization.

As noted above, the present application is configured for integration with third party mail-room digitization. An example configuration and corresponding process steps representing integration of the present application with mail-room digitization is shown in FIG. 9, and now described. At step 1, physical mail is delivered to the producer's internal mail room. At step 2, a third party watermarking and sorting tool is used to process the mail, which can include a third party scanning technology 902, for example, provided by TRITEK). This can include, for example, scanning a physical envelope associated with a piece of mail and performing the following tasks:

a) generate a universally unique tracking number and watermark the tracking number on to the envelope;

b) determine the sender information and map the sender information to a document identifier provided by one or more components associated with the present application (e.g., the producer gateway 102);

c) save an image of the envelope to a respective format, such as a portable network graphics ("PNG") file;

d) store a control record representing content with the above data elements in an database that is implemented in accordance with standards governed by the producer gateway 102 (e.g., a producer gateway 102 managed mail room content ("MRC") database, which can be a "scan control table");

e) map a recipient's address to the actual location of the recipient in the organization, and watermark the information on the envelope or generate a label with the correct address; and f) sort the envelopes into bins for delivery to the correct recipients.

Continuing with reference to the example integration implementation shown in FIG. 9, at step 3 one or more mail handlers, such as in the producer's mail room, open the envelope and scan the watermarked envelope and its contents. The scanning process can include the creation of a PDF file (or other suitably formatted file) that includes all of the scanned pages. The PDF file is stored in a file system at and/or managed by the producer gateway 102. Moreover, a record that includes a link to the file and/or of the location of the file is loaded into the MRC Database. At step 4, a process occurring at the producer gateway 102, such as a daemon, operates to read the MRC database, to create one or more transmission batches, and to instruct the content transmission process to send a batch of documents to one or more recipients that are within the producer's domain.

Continuing with reference to the example integration implementation shown in FIG. 9, at step 5 a content transmission initiator component in the producer gateway 102 reads the batch records specified by the batch creation demon process from the MRC database, the scanned PDF file(s) from the file system of the producer gateway 102. Each PDF file may be encrypted with a unique symmetric key (e.g., generated on-line using JAVA's Crypto Library and the AES 256 Algorithm). Further, a dispatch summary file is created for the transmission and a content dispatch command message placed on the AESK request generator queue.

Figure 10:
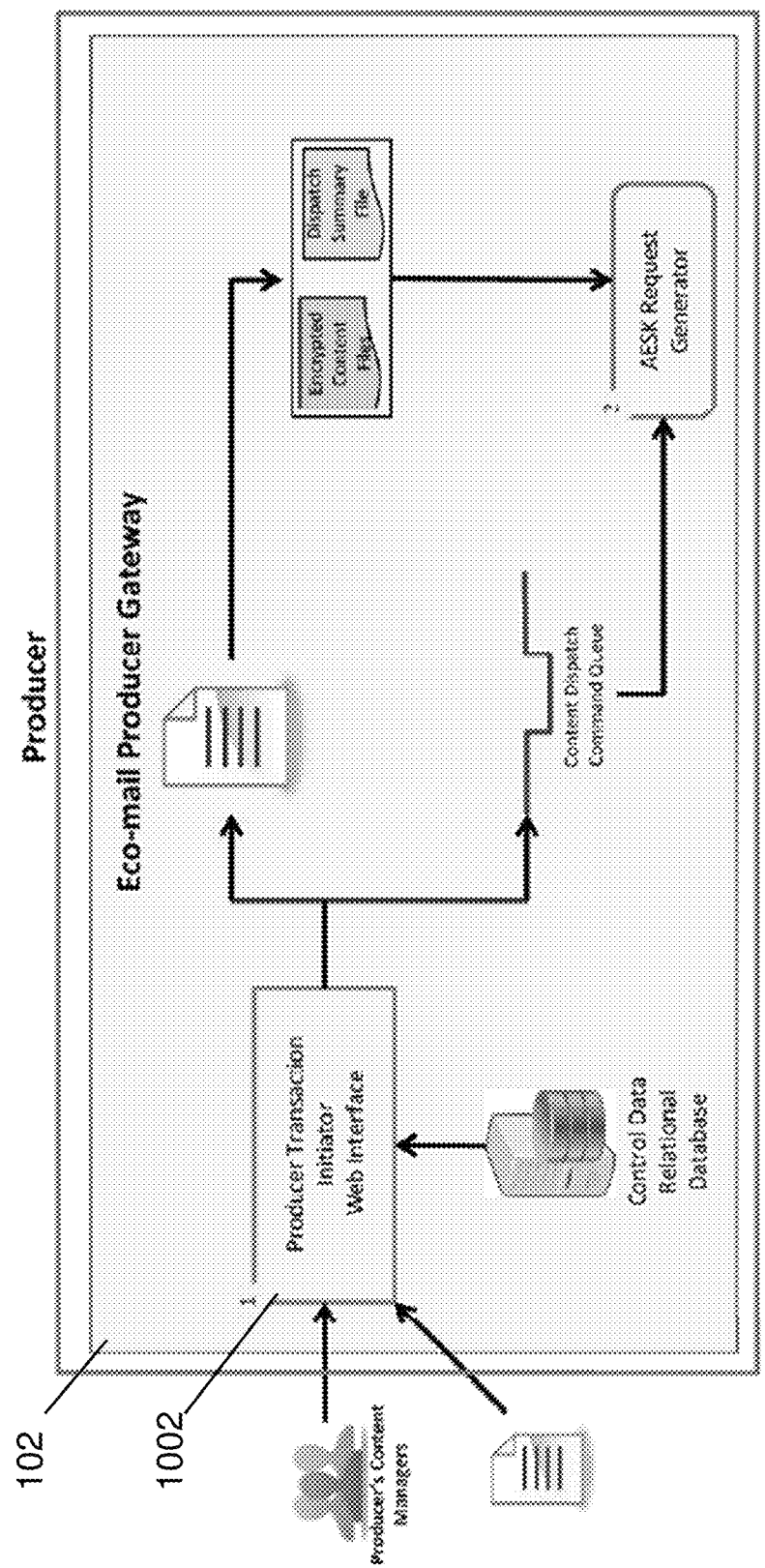
FIG. 10 shows an example configuration and corresponding process steps representing integration of the present application with ad-hoc dispatch.

As noted above, the present application is also configured for integration for ad-hoc dispatch. An example configuration and corresponding process steps representing integration of the present application with ad-hoc dispatch is shown in FIG. 10, and now described. At step 1, one or more of the producer's content managers and/or operators log into a producer transaction initiator web site interface 1002, which can be configured as part of or managed by the producer gateway 102. Once authenticated and logged in, the operator provides a PDF file to the interface 1002 and defines values corresponding with one or more actions on the document (shown and described in greater detail below with reference to FIGS. 11A and 11B).

Continuing with reference to FIG. 10, the website interface 1002 loads the PDF file to one or more servers at the producer gateway 102 prior to displaying the document. Once the document is successfully loaded, the interface 1002 displays document so that the operator can review the document. The operator sets one or more parameters on the document (e.g., document identifier, action data, and recipients) and submits the document to the website. Once submitted, the website interface 1002 embeds the document with action data input or otherwise defined by the operator, generates a symmetric key and encrypts the document with the generated symmetric key. A message is placed on the content dispatch command queue to transmit the document. At step 2 the AESK request generator then takes the process forward, substantially as shown and described herein, until the content is packaged and transmitted to the consumers 112.

Figure 11A:
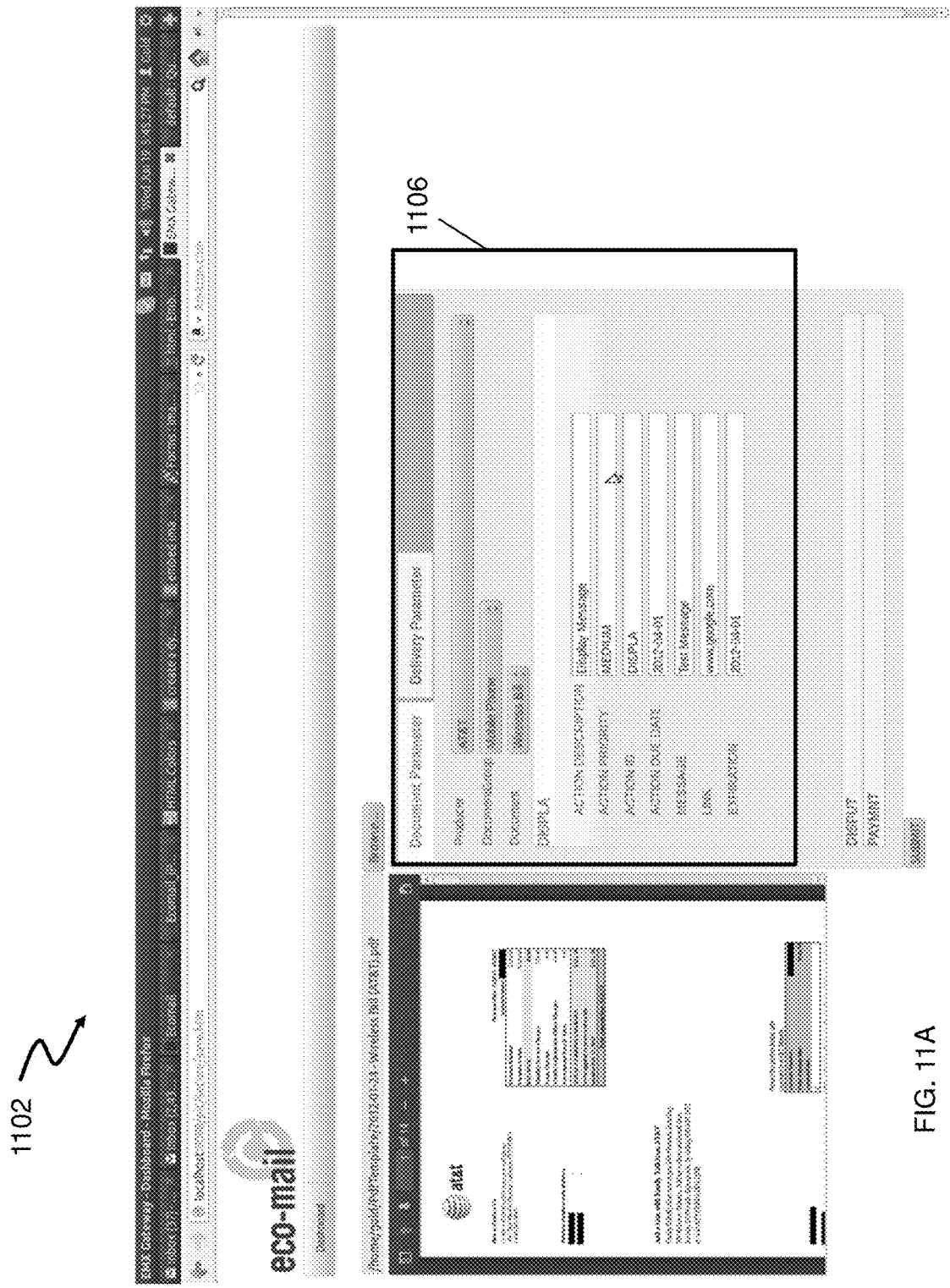
FIGS. 11A and 11B illustrate example display screens respectively associated with an example web site interface.
Figure 11B:
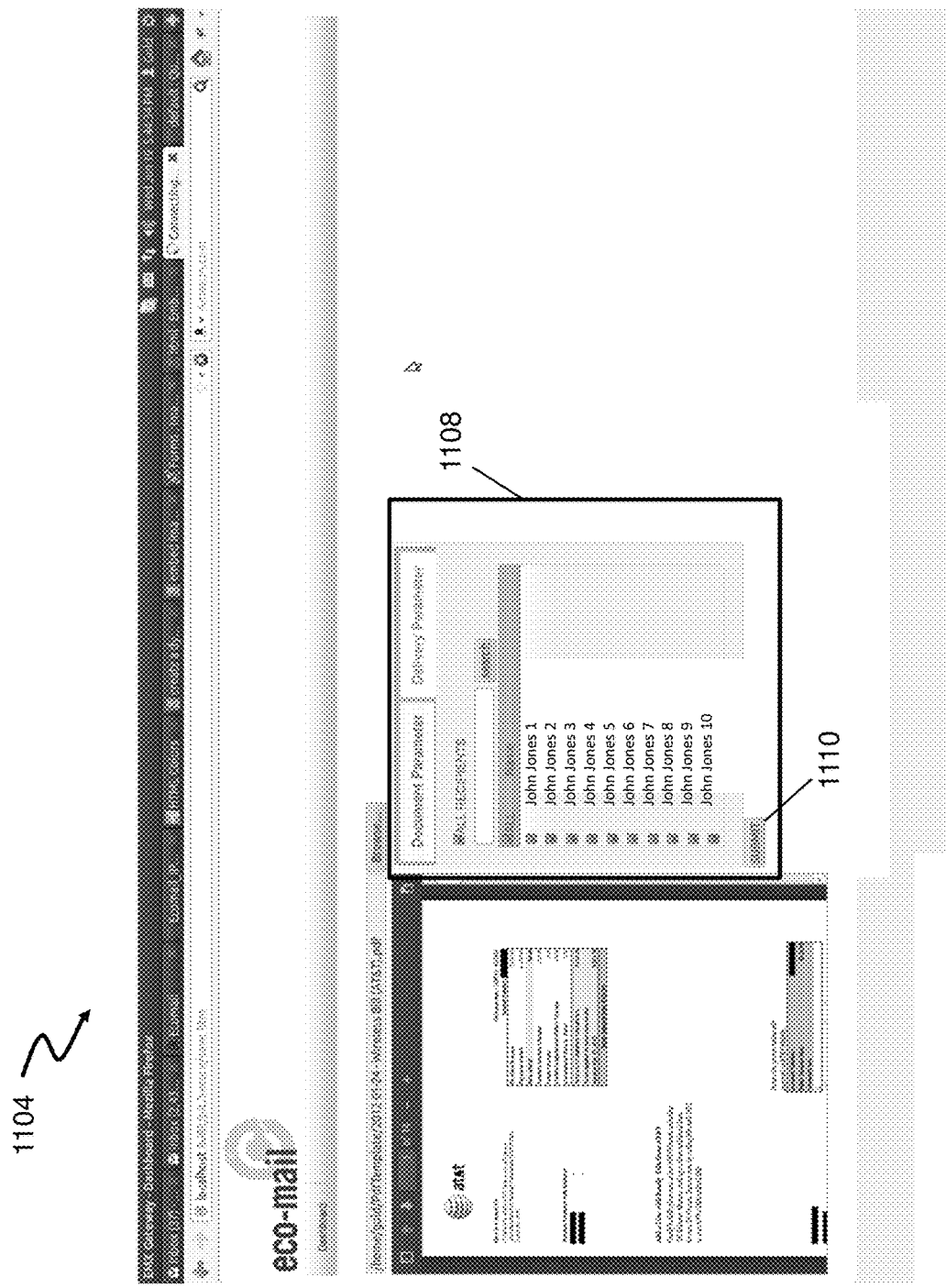

FIGS. 11A and 11B illustrate example display screens 1102 and 1104, respectively associated with an example web site interface 1002. In operation and at step 1, an operator loads a document from virtually any file system that is accessible from the operator's browser. The website loads the file into a respective Web Server, and displays the document in a website window. At step 2, the operator sets one or more document options using features 1106, shown in FIG. 11A on the right hand side window. Selectable document parameters may include producer, document group, and document type. These options allow the application to search a control data database associated with the producer gateway 102 for respective actions that are registered to or otherwise correspond with the document type that is selected. At step 3, the operator enters data for actions, as appropriate. Example actions included in the example display screen 1102 include description, priority, ID, due date, message, link and expiration. At step 4, the operator selects the recipients of the document in the delivery parameters section 1108 (FIG. 11B). In the example display screen 1104, the operator can elect to send the document to all the recipients of the document that have a subscription to the document or pick individual recipients of the document form this screen. At step 5, the operator selects a graphical screen control, such as "submit" button 1110 to initiate the process of document transmission, and to take the process forward, substantially as shown and described herein, until the content is packaged and transmitted to the consumers 112.

Figure 12:
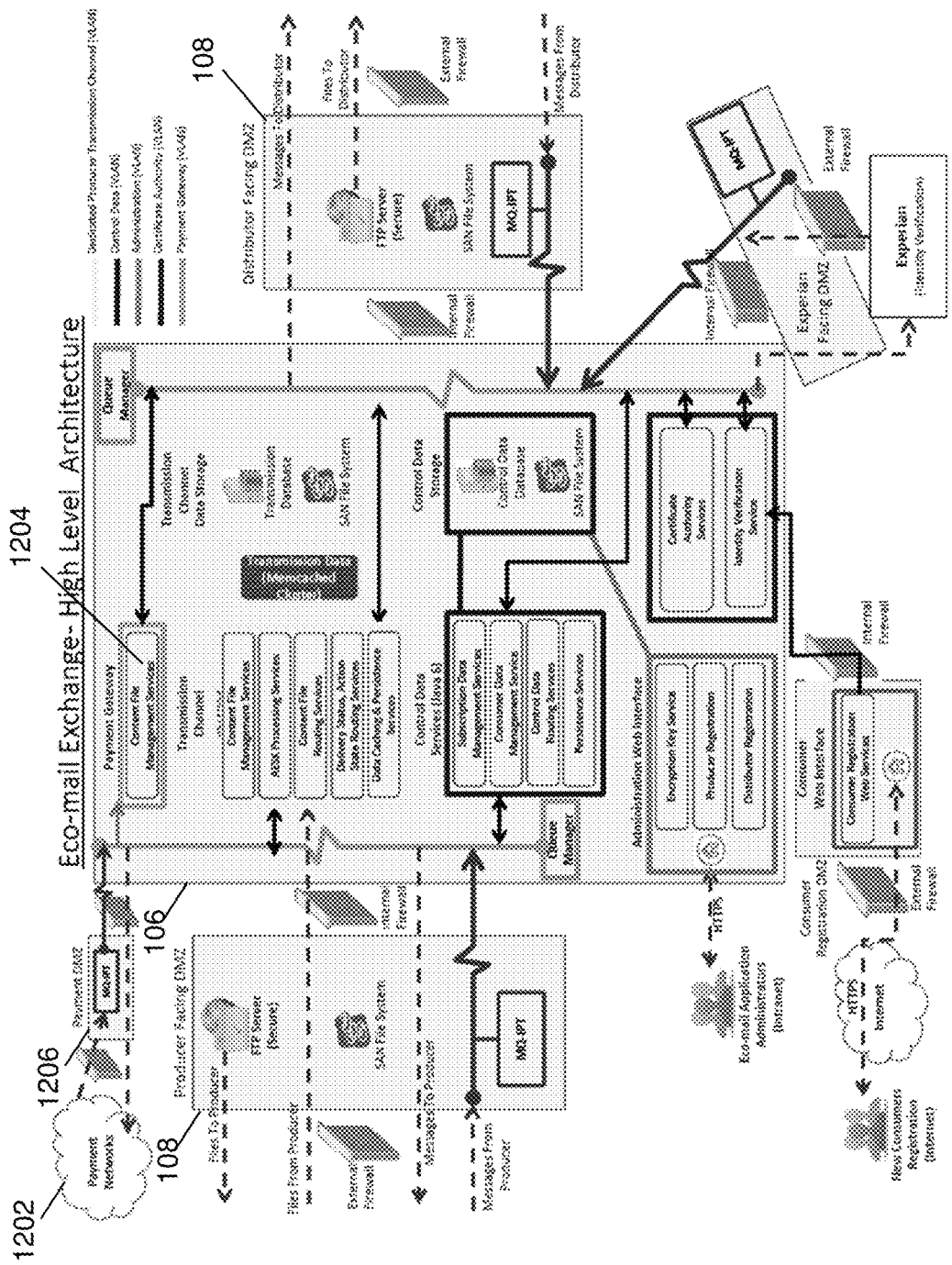
FIG. 12 is a block diagram that illustrates an example high level architecture of a mail exchange.

FIG. 12 is a block diagram that illustrates an example high level architecture of the mail exchange 106, in accordance with an example implementation of the present application. In one or more implementations the mail exchange 106 is a set of software and hardware components (including, but not limited to Java Services, CXF Web Services, Websphere MQ Queues, Memcached Clusters, Resin Web Server Clusters, SQL Databases, SecureFTP, San Storage, Firewalls, and one or more demilitarized zones) that enable the transit of encrypted and unencrypted (e.g., clear text) content from the producer gateway 102 to the distributor gateway 110.

In one or more implementations, the mail exchange 106 includes a plurality of external interfaces. For example, these external interfaces can be in communication with the producer gateway 102, distributor gateway 112, payment networks 1202, consumers 112 requesting private keys, and new consumers 112 that are registering with the mail exchange 106. In one or more implementation, communication with producer gateway(s) 102, distributor gateway(s) 110, and payment networks 1202 occurs over one or more leased lines.

Referring now to some example external interfaces included with the mail exchange 106 shown in FIG. 12, the producer gateway 106 interface can be implemented in a dedicated virtual local area network ("VLAN") and that may be provided in a respective demilitarized zone (i.e., there may be one VLAN per producer in the DMZ). Each producer interface can also be configured with a dedicated transmission channel for additional transmission security. For example, transmission-related services and components including databases and caches are provided separately for each producer. Moreover, the mail exchange 106 distributor gateway interface can also be implemented in a dedicated VLAN in the demilitarized zone (i.e., there may be one VLAN per distributor).

Continuing with reference to the example mail exchange 106 architecture shown in FIG. 12, mail exchange 106 can host a payment gateway 1204 in which payment instructions set by the consumer are dispatched to a payment network 1202. Messaging to and from the payment network(s) 1202 can be over a mechanism of secure communication preferred by the respective payment network 1202, such as SecureMQ. In one more implementations, the payment gateway 1204 receives status messages from the payment network(s) 1202, and sends the messages to the consumer at the distributor gateway 110.

Moreover, mail exchange 106 can be configured to host a new consumer registration website. In an example operation, a consumer submits personal information over a secured connection, such as HTTPS, which is forwarded to EXPERIAN, which returns one or more challenge questions for response by the registering consumer. After the user's answers are confirmed to be correct (e.g., are matched), the identity of the consumer is confirmed and the individual is registered as a consumer in the platform, shown and described herein. In one or more implementations, script-based processes can be provided to load consumer records sent by the producer. The scripts can be run by support staff associated with the mail exchange 106. Consumer data records sent by the producer are considered as trusted.

Further, the mail exchange 106 can be configured with a secure administration website that is usable for administrative users having sufficient authentication within an organization. The administration website has features such as application monitoring and launching the services authentication and encryption key service. An administrator can also maintain and manage producer and distributor registration information through this website.

In one or more one or more implementations, processes occurring on received information in the mail exchange 106 separate out the transmission data from control data. As used herein, transmission data relates, generally, to transmissions containing content and payments, and delivery state updates that are generated when the producer sends content to the distributor. Transmission data is further separated by storing it in a producer specific transmission VLANs within an intranet of the mail exchange 106. Control data relates to consumer profiles, producer and distribution information, and subscription information. Control data related to consumer profile is secured by symmetrically encrypting it (e.g., via an AES 256 algorithm) and then storing it in the control data database. Control data for all producers, distributors, and consumer is managed and stored in a common isolated VLAN.

Figure 13:
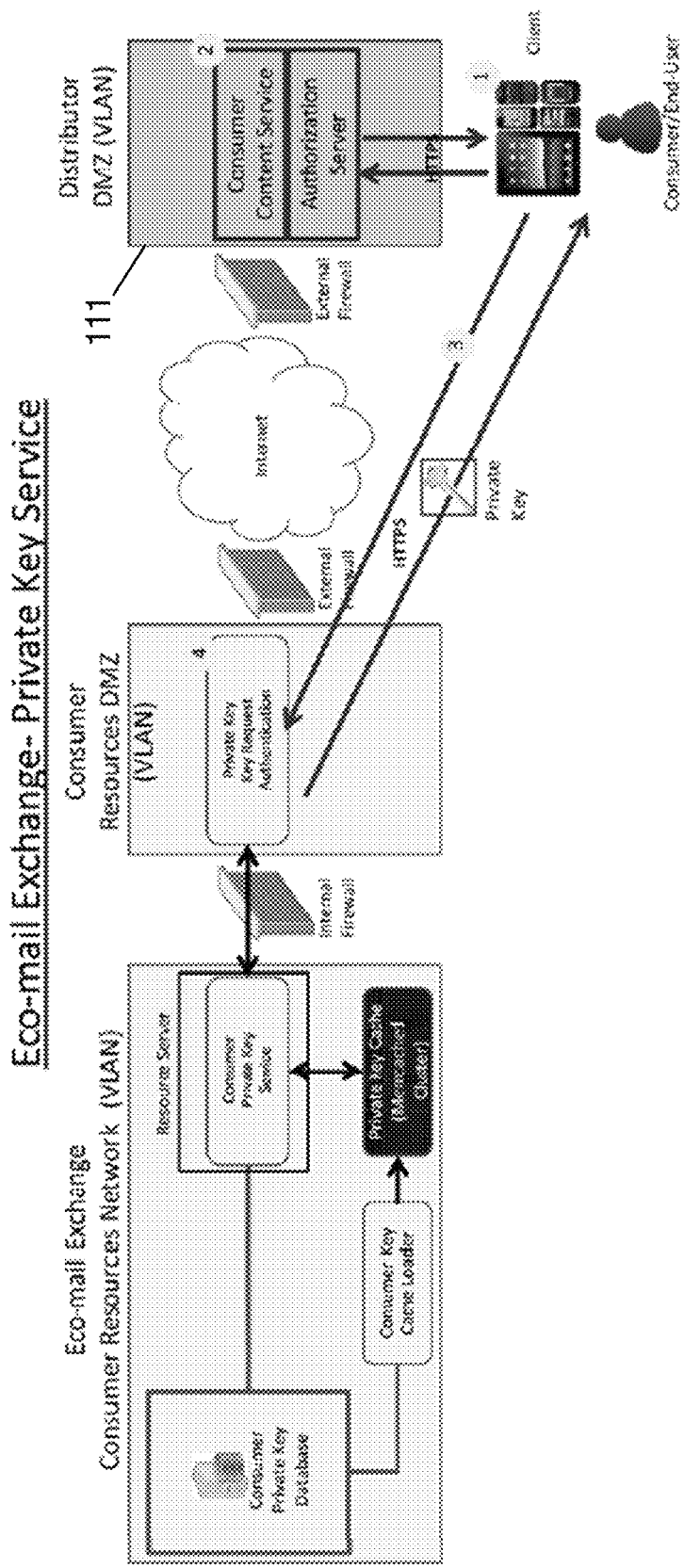
FIG. 13 is a block diagram that illustrates an example architecture and process steps associated with a private key service in connection with a mail exchange.

FIG. 13 is a block diagram that illustrates an example architecture and process steps associated with a private key service in connection with the mail exchange 106. In accordance with an example implementation, a consumer registers with the mail exchange 106, and the user's user identifier and hashed password, along with other common user profile details, are shared with the distributor gateway 110. Encrypted content sent by the producer can be stored in encrypted state in the distributor's document repository. In one or more implementations, the mail exchange 106 does not share the consumer's public and private key pair that is generated substantially as shown and described herein with either the producer of content or the distributor of content. The consumer signs in to the distributor's domain and submits a request for content. The encrypted content file is transmitted to the consumer's device, and the consumer uses the private key to decrypt and access the content. This process is repeated each time the consumer wishes to access encrypted content.

Continuing with reference to the example implementation shown in FIG. 13, within the mail exchange 106, a consumer's public key is stored in the control data network (e.g., the respective isolated VLAN). The private key is stored in a separate consumer resources network (e.g., the respective isolated VLAN). The consumer resources network, which can be unique to every distributor, can host a private key service, for example, in its respective demilitarized zone to provide the consumer with the respective private key to decrypt and access content. The user may be authenticated, for example, via a hash-based message authentication code (e.g., HMAC-SHA256) to authenticate the user to the private key service.

In connection with consumer authentication and the private key process shown in FIG. 13, at step 1, a client application requests that the consumer provide one or more resource owner password credentials, to be sent to the distributor (e.g., an authorization server). At step 2, the distributor authenticates the consumer's user ID and hashed password against a private data store maintained or otherwise accessible by the distributor. In response, the distributor creates an "access token" based on a shared secret between the mail exchange 106 and the distributor, and passes that back to the client along with the any unread encrypted content. In one or more implementations, the access token is temporary, and can be set to expire within a short period of time, such as 10 minutes. At step 3, the client makes a (e.g., a second) request to a consumer resources network via the mail exchange 106, which may include, for example, the UID+Access Token, for requesting the Private Key. Thereafter, at step 4, the consumer resources network authenticates the token, passes the credentials to the consumer private key service, which responds back with the private key of the requesting consumer.

Figure 14:
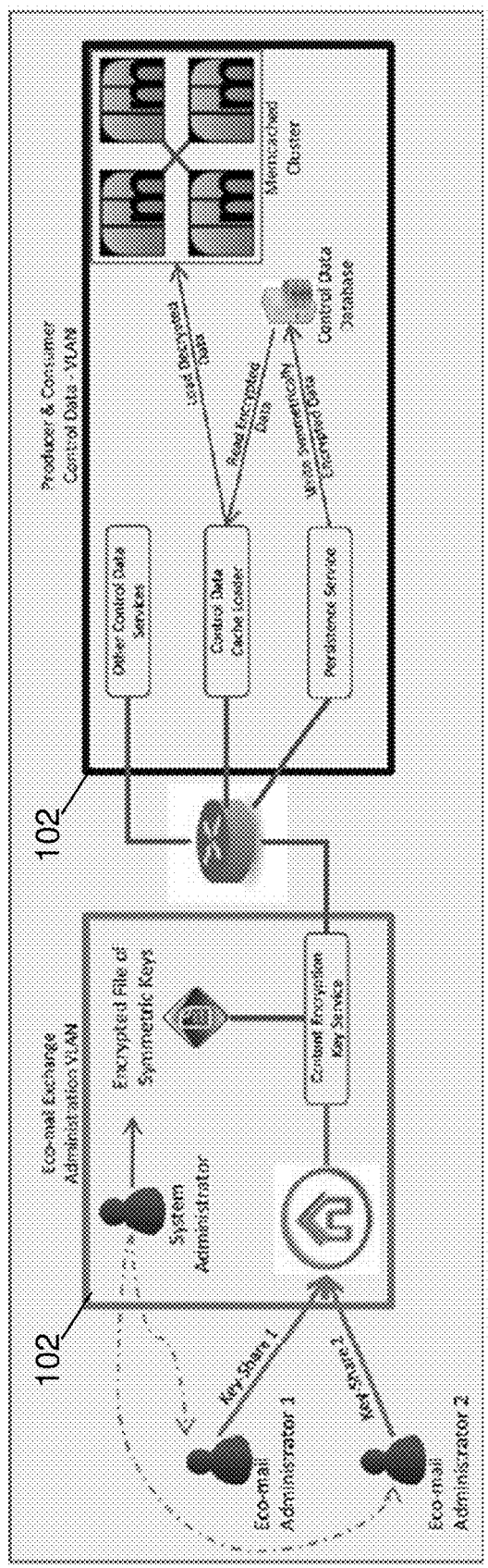
FIG. 14 is a block diagram that illustrates an example architecture and process steps associated with control and data security.

FIG. 14 is a block diagram that illustrates an example architecture and process steps associated with control and data security. In accordance with the implementation illustrated in FIG. 14, one or more processes associated with or occurring at the mail exchange 106 symmetrically encrypts and stores control data information associated with producers, distributors, and consumers, for example, in a control data database. Application services running in the producer gateway 102, distributor gateway 110, and consumer control data ("CD") domain use symmetric keys to encrypt and decipher control data information, such as when writing to and reading from the control data database. In one or more implementations, a designated mail exchange 106 system administrator (EMX-SA) loads a set of symmetric keys into a configuration file and symmetrically encrypts a configuration file, for example, with a 16 character secret string. Using an algorithm, such as Shamir's Secret Sharing Scheme (2 of 5), the EMX-SA creates 5 key-shares, and communicates a separate key-share to each of five mail exchange 106 application administrators. Any of the two applicant administrators can then put in their key-shares into a separate entry screens of the mail exchange 106 administration website. Once both key-shares are input, the content encryption key service reads the encrypted configuration file and loads the symmetric keys and service signatures into memory.

Continuing with reference to the example implementation shown in FIG. 14, each application service authenticates against the content encryption key service ("CEKS") in the mail exchange 106 administration domain upon startup, for example, by passing the application service's service signature. Separate encryption keys can be used to encrypt files relating to component configuration, producer configuration, distributor configuration, and consumer profile information by the persistence service. The persistence service can encrypt and then load the encrypted data into the control data database. The cache loader service reads encrypted data from the control data database, deciphers it and then loads the objects, for example, into the Memcached Cluster. Upon startup, each component in the control data domain uses a specific symmetric key received from the content encryption key service to decrypt its respective configuration file, and to load configuration settings into memory. In one or more implementations and as a fall back to reading data from caches, each component can be configured to read the encrypted information from the database and decipher it using the symmetric key received from the content encryption key service.

Figure 15:
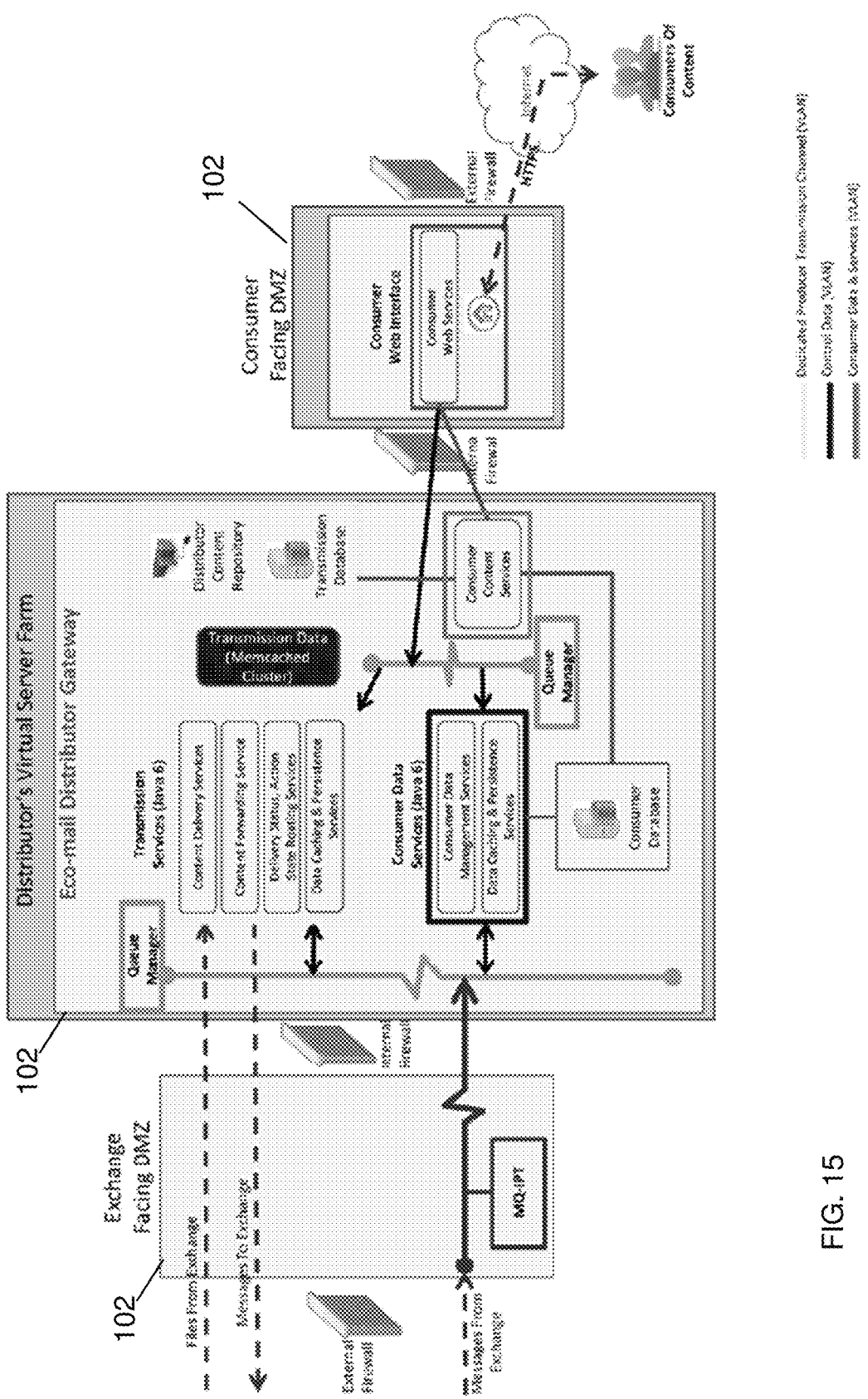
FIG. 15 is a block diagram that illustrates an example high level architecture of a distributor gateway, in accordance with an example implementation of the present application

FIG. 15 is a block diagram that illustrates an example high level architecture of the distributor gateway 110, in accordance with an example implementation of the present application. In one or more implementations the distributor gateway 110 can be deployed on the distributor's virtual server farm. The distributor gateway 110 can be configured to implement separate VLANs for control data and transmission data. Configuration and setup of components associated with the distributor gateway 110 can depend, for example, on individual distributor preferences and available infrastructure.

In operation, the distributor gateway 110 communicates with the mail exchange 106 via a dedicated VLAN in the distributor gateway demilitarized zone 111. Consumer web services may be exposed to handle communication with the consumer user interface on an isolated VLAN in the distributor gateway demilitarized zone 111. One or more processes executing on computing devices in or associated with the distributor gateway 110 receive content files from the mail exchange 106. While command messaging and other data can be exchanged bi-directionally between the distributor gateway 110 and the mail exchange 106, such as over secureMQ, in one or more implementations, files and other content does not flow from the distributor gateway 110 to the mail exchange 106.

Figure 16:
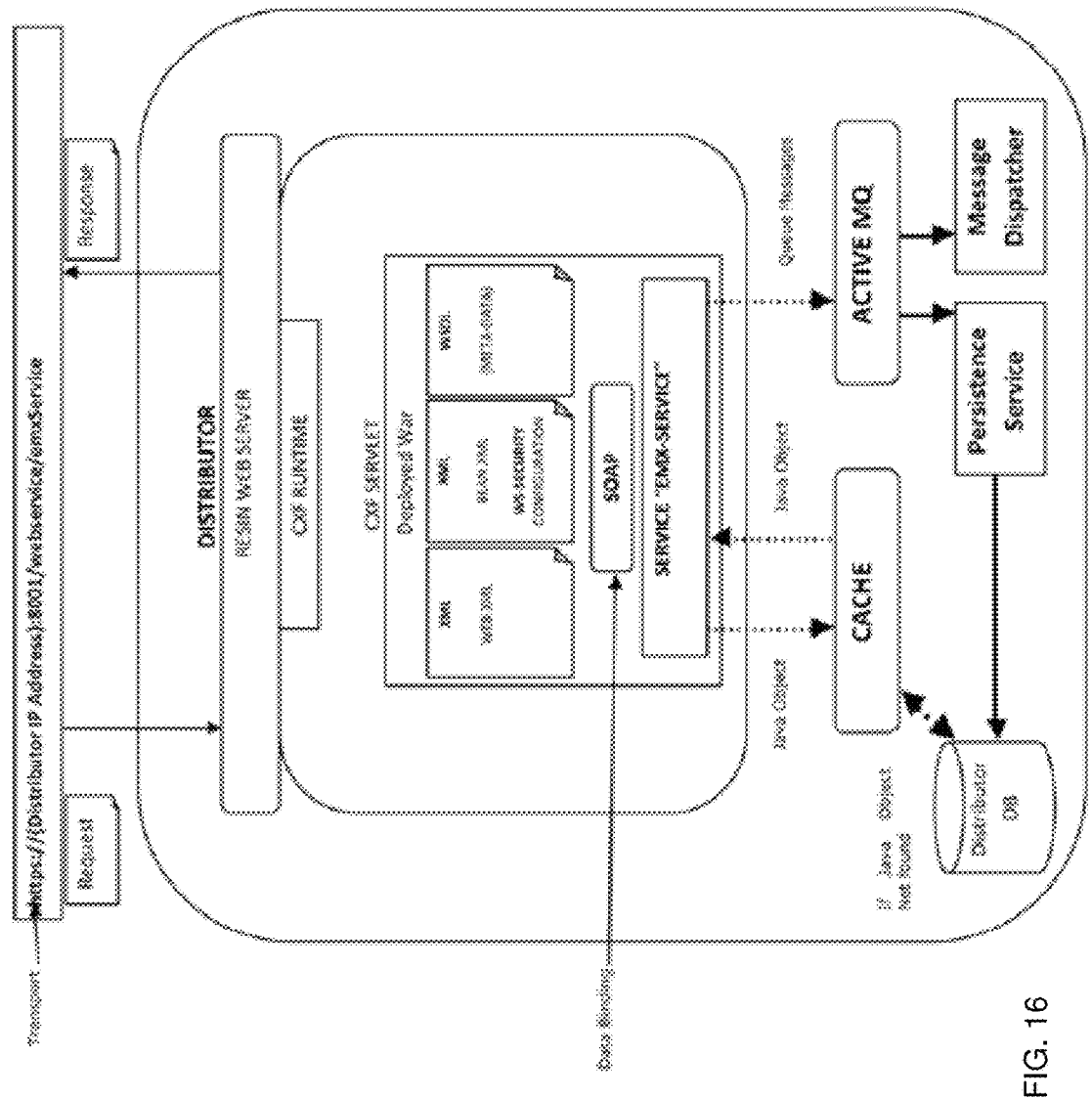
FIG. 16 is a block diagram that showing components associated with a consumer interface with a distributor gateway.

FIG. 16 is a block diagram that shows components associated with a consumer interface with the distributor gateway 110. In one or more implementations, consumer web services provided in accordance with the present application are a single interface to the consumer user interface on web browsers, desktops, and mobile devices. Communication between the user interface and the consumer web service can happen using well-structured structured object access protocol ("SOAP") and/or XML messages and over secure sockets layer ("SSL") and/or transport layer security ("TLS"). The web service security can be extended by adding XML signatures to secure SOAP messages. The web service can implement nonce and a timestamp into the header of the SOAP messages, for example, to prevent replay attacks. Unique Ids can be assigned to messages to prevent reuse of messages. The web service authenticates the consumer's credentials (userid/hashed passwords or RSA certificate) and passes the request to a consumer data service, for example, that is running in the intranet of the distributor.

Continuing with reference to the block diagram shown in FIG. 16, content is sent to the user interface from the web service in its original encrypted form. The user interface requests the consumer's private key from a private key service within or otherwise accessible to the mail exchange 106 and is usable to decrypt the content on demand. In an implementation in which the user interface supports a local repository, content received from the distributor can be stored in encrypted state. When the user wants access to the content, the user interface can use the consumer's private key to decrypt and provide the content. The local repository can also store other information, such as the consumer's content records, reference data (e.g., subscriptions), producer information, and information of other consumers who have shared content with the primary consumer.

Figure 17:
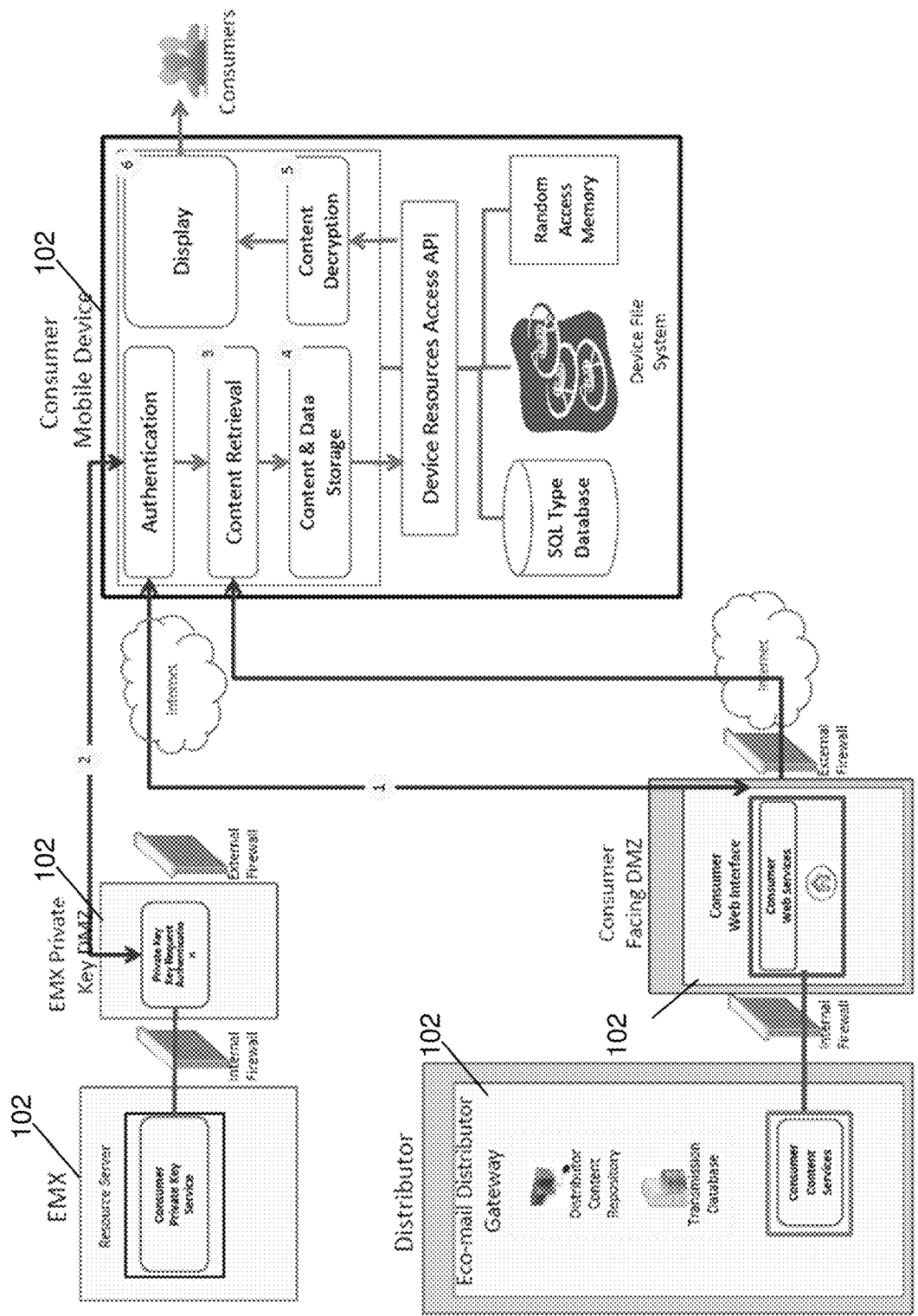
FIG. 17 is a block diagram that illustrates an example architecture and process steps associated with content storage and decryption, in accordance with an example implementation of the present application.

FIG. 17 is a block diagram that illustrates an example architecture and process steps associated with content storage and decryption, in accordance with an example implementation of the present application. With reference to FIG. 17, consumer authentication is implemented in a two part process. At step 1, the first part occurs when the consumer logs into a respective application and attempts to be authenticated against web services maintained by or otherwise accessible to the distributor gateway 110. For example, one or more processes operating on the distributor gateway 110 authenticates the consumer's user identifier and password and, if successful, delivers a token based on HMAC-SHA256 and a shared secret value with the mail exchange 106. At step 2, the second part of authentication includes the consumer's device sending the token received from the distributor gateway 110 to the mail exchange 106. The mail exchange 106 generates an internal token and compares the internal token to the token received from the consumer's device. The mail exchange also authenticates the respective user identifier and password that was submitted by the consumer. Once the two credentials match, a private key service associated with or occurring within the mail exchange 106 responds back with the consumer's private key, for example, over HTTPS. The private key can be stored in a session variable or secure storage (e.g., iOS' Key Chain). In one or more implementations, the private key is not stored to disk. In this way, as long as the application is running on the device, the private key is available for the consumer to decrypt and have access to content.

Continuing with reference to the example implementation shown in FIG. 17, at step 3 and after the consumer has received the private key, a request is transmitted to the distributor gateway 110 for new content. Content packages are downloaded in their respective original encrypted state. A content retriever process is operable to examine public meta-data associated with each content package for, for example, markers indicating linked-content. When a linked-content file is detected, the content retriever decrypts the AESK corresponding to the consumer, decrypts the content to get the actual link, and downloads the actual content package from the link location, for example, over HTTPS. At step 4, public meta-data that is embedded in the content in clear text format is extracted and loaded into a relational database, such as SQL or the like, on the consumer's device 112. The encrypted content package itself can be stored on the consumer's device file system, including a mobile device file system. A pointer/reference to the content file location can also be stored in the database record.

Continuing with reference to the example implementation shown in FIG. 17, at step 5 the consumer requests access to the actual content sent by the producer. In response, a content decryption service operating in the consumer device, which may be a mobile device, accesses the encrypted content and the consumer's private key, and performs a double decryption process. For example, the asymmetrically encrypted symmetric key corresponding to consumer's identifier is decrypted, and the symmetric key is extracted. The symmetric key is usable, thereafter, to decrypt the content. In one or more implementations, neither the decrypted content nor the symmetric key is stored anywhere on the consumer (e.g., mobile) device. Instead, both of these elements are discarded as the consumer moves on to access other content on his/her device. At step 6, the consumer (e.g., mobile) device accesses the actual content sent by the producer to the consumer. After the consumer navigates away from the content access (e.g., view) screen, the decrypted content is discarded from the device's memory. If the consumer wishes to see the content again, the content decryption process is repeated and the content is provided again for the consumer.

Thus, as shown and described herein, one or more machines (e.g., a computer or server having a processor and memory) process transactions in support of delivery between producers and consumers as a function of a secured and multi-level platform. Each machine, computer, or server described herein includes a processor that executes code to configure the processor into a special purpose machine suitable for implementing the functionalities described.

In one or more implementations, one or more processes operating on the producer gateway 102 can create a particular envelope file for each piece of content dispatched by the producer for delivery to the consumer through the mail exchange 106. The envelope file, referred to herein as the content package file may be configured with a ".EMX" extension. In one or more implementations, the payload of this file is provided in an XML structure and contains a public meta-data section and a content section.

The public meta-data section of the content package file can contain addressing information that enables content delivery by the mail exchange 106 to the correct consumer associated or at the correct distributor gateway 110. This addressing information can also be in an XML structure defined in a particular document schema. The content section of the content package file can contain a byte stream of encrypted data. These data are provided, for example, in a PDF content file and embedded with an XML data structure defined in a private meta-data part of the schema, and then symmetrically encrypted by the producer, for example, using a randomly generated symmetric key.

In accordance with an implementation of the present application, the particular schema includes of two respective XML schemas. As noted above, the first schema is the public meta-data schema and the second schema is the private meta-data schema. These two meta-data schemas can be embedded into the content package file by two different processes. For example, the producer gateway 110 can embed the public meta-data structure into the document header in clear text. The producer of the content can embed the private meta-data data structure into the PDF content file, for example, by using APIs associated with the extensible metadata platform ("XMP").

The public meta-data section of the CPF contains an XML structure that is based on the following schema.

```
<?xml version="1.0" encoding="UTF-8"?>
.targetNamespace="http://www.eclipse.org/webtools/PublicMetaData"
   xmlns:mail exchange 106="http://www.eclipse.org/webtools/PublicMetaData">
   <annotation>
     <documentation xml:lang="en">
       Schema for Public Meta-Data.
       Copyright Eco-mail Development LLC
     </documentation>
   </annotation>
   <element name="PublicMetaData" type="mail exchange
106:PublicMetaDataType"></element>
   <complexType name="PublicMetaDataType">
     <sequence>
       <element name="transmissionId" type="string" minOccurs="1"
maxOccurs="1"/>
       <element name="producerId" type="string" maxOccurs="1"
minOccurs="1"/>
       <element name="keyPackage" type="string" maxOccurs="1"
minOccurs="0"/>
       <element name="action" type="mail exchange 106:ActionInfo"
maxOccurs="1" minOccurs="1"/>
       <element name="contentType" type="string" maxOccurs="1"
minOccurs="1"/>
       <element name="encrypted" type="string" maxOccurs="1"
minOccurs="1"/>
       <element name="auditTrail" type="mail exchange 106:AuditTrailDetail"
maxOccurs="1" minOccurs="0"/>
       <element name="image" type="string" maxOccurs="1" minOccurs="0"/>
     </sequence>
   </complexType>
   <complexType name="ActionInfo">
     <attribute name="actionRequired" type="string" use="required"/>
     <attribute name="actionDueDate" type="string" use="optional"/>
   </complexType>
   <complexType name="AuditTrailDetail">
     <sequence>
       <element name="auditRecord" type="mail exchange
106:AuditRecordDetail"
       maxOccurs="unbounded" minOccurs="0"/>
     </sequence>
   </complexType>
   <complexType name="AuditRecordDetail">
     <attribute name="actionDate" type="string" use="required" />
     <attribute name="fromSourceRecipientName" type="string" use="required" />
     <attribute name="toTargetRecipientName" type="string" use="optional" />
     <attribute name="actionType" type="string" use="required" />
   </complexType>
</schema>
```

In accordance with the example public metadata schema section, the element "transmissionId" represents the universally unique 36 character identifier assigned by the mail exchange 106 to each respective content package. The transmissionId can be generated when the mail exchange 106 creates an asymmetrically encrypted symmetric key for each content package. In one or more implementations, this is a required element and the producer provides a value in the XML structure for this element. The element, producerId represents the universally unique 36 character identifier assigned by the mail exchange 106 to the producer when the producer registers with the mail exchange 106. In one or more implementations, this is a required element and the producer provides a value in the XML structure for this element. The element, keyPackage, represents a stream of data containing one asymmetrically encrypted symmetric key for each consumer that is to receive the content package file. This field can contain the key package and can be an optional element and is dependent on the "encrypted" flag. If the content is encrypted, then the keyPackage element will be populated.

Continuing with reference to the example public meta-data schema, the element "action" indicates that the producer is requesting that the consumer take an action on the file. In one or more implementations, the "action" element can have the following required and optional attributes: "actionRequired"—this is a (Yes/No) field indicating if action is required; "actionDueDate"—this attribute is the date the action is due by. It is a date field and is set when the "actionRequired" attribute is set to "Y". In one or more implementations, action is a required element to be populated by the producer. The element "contentType" represents the type of file embedded in the content section of the content package file. The producer can send PDFs, PNG, JPEG, IMG, and other file types to the consumer. In one or more implementations, this is a required element and the producer provides a value in the XML structure for this element. The element "encrypted" represents whether the content embedded in the content section is encrypted or unencrypted. In one or more implementations, this is a required element and the producer provides a value in the XML structure for this element.

Continuing with reference to the example public metadata schema, the element "auditTrail" is a grouping element containing or more audit trail records. This is an optional element and the producer may not provide any information for this element. The element "auditRecord" is contained within the "auditTrail" element. This element contains the following required/optional attributes: Required Attribute: "actionDate"—this is a date field containing the time the action was taken on the content; Required Attribute: "fromSourceRecipientName"—this is a text field containing the name of the person who took the action; Optional Attribute: "toTargetRecipientName"—this is a text field containing the name of the person who was the target of the action; and Required Attribute: "actionId" this is a text field indicating what type of action was taken (FWDDEL—Forward and Delete, FWDKEP—Forward and keep, PRINTX—Print Document, EMAILX—Email Document). In one or more implementations, this is a required element and the audit trail component in the producer and distributor provides values for all required attributes of this element. In one or more implementations, the element "image" contains a binary data stream of an unencrypted image file. This is an optional element and the producer may not provide a value in the XML structure for this element.

The content section contains the symmetrically encrypted content file with embedded private metadata. The producer first embeds the private metadata into the content file and then symmetrically encrypts it with a randomly generated symmetric key. An example private metadata schema is shown below, and corresponding individual elements are described below.

```
<?xml version="1.0" encoding="UTF-8"?>
targetNamespace="http://www.eclipse.org/webtools/PrivateMetaData" xmlns:mail exchange
106="http://www.eclipse.org/webtools/PrivateMetaData">
    <annotation>
        <documentation xml:lang="en">
            Schema for Private Meta-Data
            Copyright Eco-mail Development LLC
        </documentation>
    </annotation>
    <element name="PrivateMetaData" type="mail exchange
106:PrivateMetaDataType"></element>
    <complexType name="PrivateMetaDataType">
        <sequence>
            <element name="producerDetails" type="mail exchange 106:ProducerDetail"
minOccurs="1" maxOccurs="1"/>
            <element name="documentDetails" type="mail exchange 106:DocumentDetail"
maxOccurs="1" minOccurs="1"/>
        </sequence>
    </complexType>
    <complexType name="ProducerDetail">
        <attribute name="producerId" type="string" use="required" />
        <attribute name="consumerId" type="string" use="required" />
        <attribute name="subscriptionId" type="string" use="required" />
    </complexType>
    <complexType name="DocumentDetail">
        <sequence>
            <element name="actions" type="mail exchange 106:action"
minOccurs="0" />
        </sequence>
        <attribute name="customerIdentifierType" type="string" use="required" />
        <attribute name="customerIdentifier" type="string" use="required" />
        <attribute name="documentId" type="string" use="required" />
        <attribute name="documentCategoryId" type="string" use="required" />
        <attribute name="periodDescription" type="string" use="required" />
        <attribute name="periodStart" type="string" use="required" />
        <attribute name="periodEnd" type="string" use="required" />
        <attribute name="documentDate" type="string" use="required" />
        <attribute name="producerMessage" type="string" use="optional" />
    </complexType>
    <complexType name="action">
        <sequence>
            <element name="thirdPartyPayment" type="mail exchange
106:ThirdPartyPayment" minOccurs="0" />
            <element name="payment" type="mail exchange 106:PaymentAction"
minOccurs="0" />
            <element name="acknowledistributor gateway 110ement" type="mail
exchange 106:Acknowledistributor gateway 110ementAction" minOccurs="0" />
            <element name="acceptDeline" type="mail exchange
106:AcceptDeclineAction" minOccurs="0" />
            <element name="dispute" type="mail exchange 106:DisputeAction"
minOccurs="0"/>
            <element name="display" type="mad exchange 106:DisplayAction"
minOccurs="0"/>
        </sequence>
    </complexType>
```

```
<complexType name="baseAction">
    <sequence>
        <element name="message" type="string" />
        <element name="link" type="string" />
        <element name="expirationDate" type="string" />
    </sequence>
    <attribute name="actionDescription" type="string" use="required" />
    <attribute name="actionPriority" type="mail exchange 106:PriorityType" use="required" />
    <attribute name="actionId" type="mail exchange 106:ActionType" use="required" />
    <attribute name="actionDueDate" type="string" use="optional" />
</complexType>
<complexType name="ThirdPartyPayment">
    <complexContent>
        <extension base="mail exchange 106:baseAction">
            <attribute name="beneficiaryName" type="string" use="required" />
            <attribute name="beneficiaryAccount" type="string" use="required" />
            <attribute name="amountDue" type="string" use="optional" />
            <attribute name="minimumAmountDue" type="string" use="optional" />
            <attribute name="routingNo" type="string" use="optional" />
            <attribute name="referenceInfo" type="string" use="optional" />
        </extension>
    </complexContent>
</complexType>
<complexType name="PaymentAction">
    <complexContent>
        <extension base="mail exchange 106:baseAction">
            <attribute name="autoPaid" type="mail exchange 106:AutoPayType" use="required" />
            <attribute name="amountDue" type="string" use="required" />
            <attribute name="minimumAmountDue" type="string" use="optional" />
        </extension>
    </complexContent>
</complexType>
<complexType name="Acknowledistributor gateway 110ementAction">
    <complexContent>
        <extension base="mail exchange 106:baseAction">
            <sequence>
                <element name="responseData" type="mail exchange 106:Acknowledistributor gateway 110ementData"/>
            </sequence>
        </extension>
    </complexContent>
</complexType>
<complexType name="AcceptDeclineAction">
    <complexContent>
        <extension base="mail exchange 106:baseAction">
            <sequence>
                <element name="acceptData" type="mail exchange 106:AcceptActionData"/>
            </sequence>
        </extension>
    </complexContent>
</complexType>
<complexType name="DisputeAction">
    <complexContent>
        <extension base="mail exchange 106:baseAction" />
    </complexContent>
</complexType>
<complexType name="DisplayAction">
    <complexContent>
        <extension base="mail exchange 106:baseAction" />
    </complexContent>
</complexType>
<simpleType name="AcceptActionData">
    <restriction base="string">
        <enumeration value="ACCEPT" />
        <enumeration value="DECLIN" />
        <enumeration value="IGNORE" />
    </restriction>
</simpleType>
<simpleType name="Acknowledistributor gateway 110ementData">
    <restriction base="string">
```

```
            <enumeration value="RECIVD" />
            <enumeration value="READAK" />
            <enumeration value="ACKDISTRIBUTOR GATEWAY 110E" />
        </restriction>
    </simpleType>
    <simpleType name="ActionType">
        <restriction base="string">
            <enumeration value="3PAYMT" />
            <enumeration value="PAYMNT" />
            <enumeration value="ACKNOW" />
            <enumeration value="DISPUT" />
            <enumeration value="ACCEPT" />
            <enumeration value="SNDINF" />
            <enumeration value="DISPLA" />
        </restriction>
    </simpleType>
    <simpleType name="PriorityType">
        <restriction base="string">
            <enumeration value="HIGH" />
            <enumeration value="MEDIUM" />
            <enumeration value="LOW" />
            <enumeration value="NONE" />
        </restriction>
    </simpleType>
    <simpleType name="AutoPayType">
        <restriction base="string">
            <enumeration value="AUTOPAID" />
            <enumeration value="MANUAL" />
        </restriction>
    </simpleType>
</schema>
```

In the example private metadata schema, there are two sections. One is the document details section in which details of the document are set, and the second section is the producer detail section, in which information about the producer and actions on the document that are allowed and required are set.

Referring now to the producer detail section of the example private meta-data scheme, the element "producerId" represents a unique 36 character identifier assigned by the mail exchange 106 to the producer at the time the producer registers with the mail exchange 106. In one or more implementations, this is a required element and the producer provides a value in the XML structure for this element. The element "consumerId" is a universally unique 36 character identifier assigned by the mail exchange 106 to the consumer at the time the consumer registers with the mail exchange. In one or more implementations, this is a required element and the producer provides a value in the XML structure for this element." The element "subscriptionId" is a universally unique 36 character identifier assigned by mail exchange 106 to the subscription between a consumer and a document registered by the producer with the Eco-mail exchange. In one or more implementations, this is a required element and the producer provides a value in the XML structure for this element.

Elements associated with the document details section of the example private meta-data scheme shown above are now described. The element "baseAction" is a complex element type that defines a base set of elements and attributes that form part of actions embedded in a grouping element, "actions." The base set of elements include: "message" (a free form text field that can be populated by the producer); "link" (a URL created by the producer corresponding to the "message" element); "expirationDate" (a date field indicating the expiry date for the corresponding "link" element). Each baseAction also has some key attributes that include: "actionDescription" (a text description of the action); "actionPriority" (indicates the priority of the action, and the producer provides one of these choices: High, Medium, Low, None Required); "actionId" (a set code for the action and the producer selects from one of these choices: 3PAYMT, PAYMNT, ACKNOW, DISPUT, ACCEPT, SNDINF, DISPLAY); and "actionDueDate" (a date field specifying when the action is due). In one or more implementations, the complex element "baseAction" is a mandatory part of every action and the producer provides a value in the XML structure for this element if an action is embedded in the "documentDetails" section, including as described in greater detail, below.

Continuing with reference to the Document Details in the example schema above, the element "thirdPartyPament" is a complex element that defines elements and attributes that enable payment to a 3rd Party other than the producer. The "thirdPartyPament" element inherits elements and attributes of the "baseAction" element and has the following additional required and optional attributes: "beneficiaryName" (a name of the person, party, company or entity which will receive the payment); "beneficiaryAccount" (an account number of the 3rd party person or entity which will receive the payment); "amountDue" (an amount due for payment, which is a numeric decimal field); "minimumAmountDue" (a minimum amount due for payment, and which is a numeric decimal field); "rountingNo" (an electronic payment routing information that is used by payment network to execute the payment); "referenceInfo" (a text message field and that can include additional payment forwarding and credit information as required by the recipient's financial institution). The "thirdPartyPayment" element is optional and the producer may not provide a value in the XML structure for this element if this action is not required by the producer. Also as shown in the schema set forth above is the "payment" element, which is a complex element defines elements and attributes that enable payment to the producer. The "payment" element inherits all the elements and attributes of the "baseAction" element and has the following additional elements and attributes: "autoPaid" (—this attribute indicates if the payment has been setup to be automatically paid by the consumer with the producer. Required Attribute: "amountDue"—this is the total amount of payment due. This is a numeric decimal field. "minimumAmountDue"—this is minimum amount due for payment. This is a numeric decimal field. The "payment" element is optional and the producer may not provide a value in the XML structure for this element if this action is not required by the producer.

Although much of the foregoing description has been directed to systems and methods for code processing, the systems and methods disclosed herein can be similarly deployed and/or implemented in scenarios, situations, and settings far beyond the illustrated scenarios. It can be readily appreciated that code processing system 100 can be effectively employed in practically any scenario where code processing can be useful. For example, while many of the foregoing examples and illustrations pertain to implementations that relate to virtual/video gaming, the various technologies described herein can be implemented in any number of other settings and circumstances. By way of illustration, the apparatus, methods, and systems described herein can be implemented in a setting whereby a service provider, such as a doctor, pharmacy, insurance company, etc., can provide an item having a code to a user (e.g., a patient, customer, etc.), and such code can be perceived by a device (using a viewer such as the platform/base/lens apparatus described herein) in order to access information pertaining to the user, such as in a manner known to those of ordinary skill in the art. It should be noted, however, that in scenarios where the information being accessed is personal and/or sensitive, any number of verifications can be required (e.g., inputting a unique user ID/password) in order to ensure that only the intended recipient of the code is capable of viewing the embedded/associated information. Moreover, as described above, depending on the specifications of the particular lens and/or translucent platform through which the code is perceived by the computing device, varying degrees of access can be provided (for example, different lenses/colors can correspond to different roles, e.g., doctor, patient, nurse, pharmacist, etc., each being provided different types/degrees of access to information embedded within/associated with a particular code). It should also be noted that though much of the foregoing description and examples have been provided with respect to various codes (e.g., QR codes, etc.), any number of other methods can be similarly implemented (e.g., Bluetooth, NFC, Wi-Fi, or the likeOu) in order to provide identifying information to a device, as can be appreciated by those of ordinary skill in the art. It should be further understood that any such implementation(s) and/or deployment(s) are within the scope of the systems and methods described herein.

It is to be understood that not all components and/or steps described and illustrated with reference to the figures are required for all embodiments or arrangements. It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present invention need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for processing code(s). The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A method by which an authenticated device of a consumer, having a private key, accesses secured content across a communication network, the method comprising:
providing a user interface on the device of the consumer;
receiving, via the user interface from a distributor gateway computing device, a content package containing:
i) data in clear text format; and
ii) encrypted data,
wherein the content package includes an asymmetrically encrypted symmetric key ("AESK") usable to decrypt at least some of the data, and further wherein the encrypted data includes a link to the actual secured content within a secure domain of a remote server;

using the data in clear text format, via the user interface, to organize and arrange information in the user interface in response to the content package; and performing, under control of the device of the consumer, a double-decryption process comprising:

i) first decrypting the AESK, via the user interface using the private key, to extract a symmetric key contained in the AESK; and ii) second decrypting the encrypted data in the content package, via the user interface using the extracted symmetric key, to extract the link; and accessing the secured content, via the user interface using the extracted link.

2. The method of claim 1, wherein the step of accessing the secured content further comprises:

establishing, via the user interface, an authenticated session with the secure domain of the remote server; and accessing the secured content via the user interface during the authenticated session, wherein the actual secured content remains behind a firewall within the secure domain of the remote server.

3. The method of claim 1, further comprising:

prior to receiving the content package:

receiving, via an authenticating process by the device of the consumer, authentication for accessing the secured content.

4. The method of claim 3, wherein the step of receiving the authentication includes:

receiving, from a mail exchange computing device across the communication network, an authentication token for use by the device of the consumer;

transmitting, under control of the computing device to a second computing device across the communication network, the authentication token; and receiving, from the second computing device across the communication network, the private key usable by user interface to decrypt the AESK.

5. The method of claim 1, further comprising discarding, by the device of the consumer, the AESK and the content package after the device of the consumer accesses the secured content.

6. The method of claim 1, further comprising:

transmitting, to a distributor gateway computing device via the user interface, a request for access to the secured content, whereby the step of receiving the content package occurs in response to the request.

7. The method of claim 1, wherein the communication network is the Internet.

8. A method by which an authenticated device, having a private key, accesses secured content within a secure domain, the method comprising:

providing a user interface on the device;

receiving, via the user interface from a distributor gateway computing device, a content package containing:

i) data in clear text format; and ii) encrypted data, wherein the content package includes an asymmetrically encrypted symmetric key ("AESK") usable to decrypt at least some of the data, and further wherein the encrypted data includes a link to the actual secured content within the secure domain;

using the data in clear text format, via the user interface, to organize and arrange information in the user interface in response to the content package; and performing, under control of the device, a double-decryption process comprising:

i) first decrypting the AESK, via the user interface using the private key, to extract a symmetric key contained in the AESK; and ii) second decrypting the encrypted data in the content package, via the user interface using the extracted symmetric key, to extract the link; and accessing the secured content, via the user interface using the extracted link.

9. The method of claim 8, wherein the step of accessing the secured content further comprises:

establishing, via the user interface, an authenticated session with the secure domain; and accessing the secured content via the user interface during the authenticated session, wherein the actual secured content remains behind a firewall within the secure domain.

10. A system by which an authenticated device of a consumer, having a private key, accesses secured content across a communication network, the system comprising:

the authenticated device including at least one processor executing code that is configured to:

provide a user interface on the device of the consumer;

receive, via the user interface from a distributor gateway computing device, a content package containing:

i) data in clear text format; and ii) encrypted data, wherein the content package includes an asymmetrically encrypted symmetric key ("AESK") usable to decrypt at least some of the data, and further wherein the encrypted data includes a link to the actual secured content within a secure domain of a remote server;

use the data in clear text format, via the user interface, to organize and arrange information in the user interface in response to the content package; and perform, under control of the device of the consumer, a double-decryption process comprising:

i) first decrypting the AESK, via the user interface using the private key, to extract a symmetric key contained in the AESK; and ii) second decrypting the encrypted data in the content package, via the user interface using the extracted symmetric key, to extract the link; and access the secured content, via the user interface using the extracted link.

11. The system of claim 10, wherein the at least one processor executing code is further configured to:

establish, via the user interface, an authenticated session with the secure domain of the remote server; and access the secured content via the user interface during the authenticated session, wherein the actual secured content remains behind a firewall within the secure domain of the remote server.

12. The system of claim 10, wherein the at least one processor executing code is further configured, prior to receiving the content package, to:

receive, via an authenticating process by the device of the consumer, authentication for accessing the secured content.

13. The system of claim 12, wherein the at least one processor executing code is further configured to:

receive, from a mail exchange computing device across the communication network, an authentication token for use by the device of the consumer;

transmit, under control of the computing device to a second computing device across the communication network, the authentication token; and receive, from the second computing device across the communication network, the private key usable by user interface to decrypt the AESK.

14. The system of claim 10, wherein the device of the consumer discards the AESK and the content package after the device of the consumer accesses the secured content.

15. The system of claim 10, wherein the at least one processor executing code is further configured to:

transmit, to a distributor gateway computing device via the user interface, a request for access to the secured content, whereby the content package is received in response to the request.

16. The system of claim 10, wherein the communication network is the Internet.

* * * * *